(12) United States Patent
Menner et al.

(10) Patent No.: US 12,741,375 B2
(45) Date of Patent: Sep. 22, 2026

(54) SYSTEM AND METHOD FOR CONTROLLING A MULTI-LEGGED ROBOT

(71) Applicant: Mitsubishi Electric Research Laboratories, Inc., Cambridge, MA (US)

(72) Inventors: Marcel Menner, Arlington, MA (US); Stefano Di Cairano, Newton, MA (US); Alexander Schperberg, Los Angeles, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 207 days.

(21) Appl. No.: 18/512,130

(22) Filed: Nov. 17, 2023

(65) Prior Publication Data

US 2025/0162147 A1 May 22, 2025

(51) Int. Cl.
*B25J 9/16* (2006.01)
*B62D 57/032* (2006.01)
*B62D 57/02* (2006.01)

(52) U.S. Cl.
CPC ........... *B25J 9/1664* (2013.01); *B25J 9/1633* (2013.01); *B25J 9/1638* (2013.01); *B62D 57/032* (2013.01); *B62D 57/02* (2013.01)

(58) Field of Classification Search
CPC ...... B25J 9/1664; B25J 9/1633; B25J 9/1638; B62D 57/032; B62D 57/02
See application file for complete search history.

(56) References Cited

U.S. PATENT DOCUMENTS 9,395,726 B1 * 7/2016 Rizzi .................... B62D 57/032
2009/0005906 A1 * 1/2009 Tajima ................. B62D 57/032 901/1
2010/0161117 A1 * 6/2010 Kwak .................. B62D 57/032 700/245

(Continued)

FOREIGN PATENT DOCUMENTS

CN 114879710 A * 8/2022 ........... B62D 57/032

OTHER PUBLICATIONS

Chen, G., et al., "Virtual Model Control for Quadruped Robots", Aug. 2020, IEEE Access, vol. 8, 2020, pp. 140736-140751 (Year: 2020).*

(Continued)

*Primary Examiner* — Abby Lin
*Assistant Examiner* — Karston G. Evans
(74) *Attorney, Agent, or Firm* — Gene Vinokur

(57) ABSTRACT

The present disclosure discloses a system and a method for controlling a robot to perform a task. The robot is a legged robot that comprises a trunk and a plurality of legs for supporting the trunk above a ground. The system is configured to collect a reference trajectory defining a sequence of states of the robot to perform the task and execute a stance controller configured to compute and apply reaction forces of the plurality of legs of the robot in contact with the ground to push the trunk based on the reference trajectory. The system is further configured to execute a swing controller of a plurality of swing controllers to swing a leg in response to detecting a relative position between the trunk and a foot of the leg of the robot indicative of an imbalance of a support of the trunk of the robot above the ground.

16 Claims, 27 Drawing Sheets

(56) References Cited

U.S. PATENT DOCUMENTS

| | | | | |
|---|---|---|---|---|
| 2010/0250001 | A1* | 9/2010 | Hodgins | B62D 57/032 700/245 |
| 2011/0231050 | A1* | 9/2011 | Goulding | G05D 1/0891 180/8.1 |
| 2019/0291277 | A1* | 9/2019 | Oleynik | B25J 9/1669 |

OTHER PUBLICATIONS

Shin, H. K., & Kim, B. K. (2014). Energy-efficient gait planning and control for biped robots utilizing the allowable ZMP region. IEEE Transactions on Robotics, 30(4), 986-993.

Chen, L., Ye, S., Sun, C., Zhang, A., Deng, G., Liao, T., & Sun, J. (Dec. 2019). CNNS based foothold selection for energy-efficient quadruped locomotion over rough terrains. In 2019 IEEE International Conference on Robotics and Biomimetics (ROBIO) (pp. 1115-1120). IEEE.

Sun, Z., & Roos, N. (May 2014). An energy efficient dynamic gait for a nao robot. In 2014 IEEE International Conference on Autonomous Robot Systems and Competitions (ICARSC) (pp. 267-272). IEEE.

* cited by examiner

SYSTEM AND METHOD FOR CONTROLLING A MULTI-LEGGED ROBOT

TECHNICAL FIELD

The present disclosure relates generally to robotic locomotion, and more particularly to a system and a method for controlling a robotic locomotion of a multi-legged robot.

BACKGROUND

Mobile robots are widely used to perform various tasks, for example, warehouse logistics, search and rescue operations, and carrying of loads. Different kinds of the mobile robots are employed to perform different tasks. For example, wheeled robots are particularly used for performing the various tasks in environments with smooth terrain such as warehouses, offices, and roads. An ability to traverse on wheels enables the wheeled robots to achieve high speeds on smooth surfaces. On the other hand, multi-legged robots traverse through a combination of movements of multiple legs and a body that provide a higher level of traversing versatility, especially in rough surfaces such as uneven terrains, stairs, grassy fields, forests, and the like.

However, it is difficult to achieve the higher level of traversing versatility and precise movements, as there is a need to coordinate and synchronize a body motion associated with a body of a multi-legged robot and a leg motion of each leg of the multi-legged robot to perform the various tasks. Further, it is computationally expensive and a complex task to determine a body reference trajectory to control the body motion of the multi-legged robot and a leg reference trajectory to control the leg motion of each leg of the multi-legged robot in real-time. Additionally, it is not practically feasible to pre-determine the body reference trajectory and the leg reference trajectory, as to perform the various tasks, there is a need to perform traversal operations in the smooth-surfaced environments or the rough-surfaced environments, stabilization operations to stabilize the multi-legged robot, and collision prevention operations to prevent unwanted collisions with objects, simultaneously in real-time. Additionally, collisions between the multiple legs of the multi-legged robot and a ground increase an energy consumption, thereby increasing a cost of transportation.

Accordingly, there is a need for a system and a method for controlling the multi-legged robot in an efficient manner to perform various tasks.

SUMMARY

It is an object of some embodiments to provide a system and a method for controlling a multi-legged robot to perform a task, for example, a search and rescue task, a warehouse logistics task, an infrastructure inspection task, a security task, and a monitoring task. The multi-legged robot comprises a trunk and a plurality of legs for supporting the trunk above a ground. The multi-legged robot is configured to perform the task by following a reference trajectory. Further, the system comprises a stance controller and a swing controller. The stance controller is configured to control the trunk of the multi-legged robot to perform the task. The swing controller is configured to control a leg of the multi-legged robot to perform the task.

In some embodiments, the stance controller is further configured to determine a trunk reference trajectory to control the trunk. Based on the trunk reference trajectory, the stance controller is further configured to control the trunk to follow the reference trajectory. Additionally, the swing controller is further controlled to determine a footstep reference trajectory to control the leg of the multi-legged robot. Based on the footstep reference trajectory, the stance controller is further configured to control the leg of the multi-legged robot to follow the reference trajectory.

However, simultaneous computation of the trunk trajectory and the footstep reference trajectory in real-time to control the multi-legged for performing the task is computationally expensive. Further, the simultaneous computation of the trunk reference trajectory and the footstep reference trajectory increase a cost of transportation (COT), a task completion time and an energy consumption.

To that end, some embodiments are based on a realization that the trunk reference trajectory associated with the trunk of the multi-legged robot and the footstep reference trajectory associated with the leg of the multi-legged robot may be decoupled to overcome the aforementioned problems. Further, as a result of the decoupling of the trunk reference trajectory and the footstep reference trajectory, the swing controller is agnostic to a change of space commanded by the reference trajectory.

Some embodiments are based on an objective to execute the swing controller in response to an execution of the stance controller to achieve decoupling of the trunk reference trajectory and the footstep reference trajectory. In other words, initially the stance controller is configured to determine the trunk reference trajectory to control the trunk. Based on the trunk reference trajectory, the stance controller is further configured to control the trunk to follow the reference trajectory. Hence, in response to the execution of the stance controller, the swing controller determines the footstep reference trajectory to control the leg to follow the reference trajectory.

In some embodiments, the system may comprise a plurality of swing controller to control the plurality of legs of the multi-legged robot. Further, each leg of the plurality of legs is associated with a respective swing controller of the plurality of swing controllers. The respective swing controller is configured to determine a respective footstep reference trajectory to control a respective leg of the plurality of legs.

Hence, some embodiments are based on an objective to execute the swing controller in response to an execution of another swing controller of the plurality of swing controllers to decouple trunk reference trajectory associated with the trunk of the multi-legged robot and reference trajectories associated with the plurality of swing controllers.

Further, some embodiments are based on a realization to execute the swing controller in response to the execution of the stance controller and a detection of an imbalance of a support of the trunk of the multi-legged robot above the ground. In some embodiments, a relative position between the trunk and a foot of the leg of multi-legged robot indicates the imbalance of the support of the trunk of the multi-legged robot above the ground. In some embodiments of the present invention, imbalance correspond to a state of a robot that is detected based on a relative position between the trunk and the foot of at least a leg of the robot that is indicative of an imbalance of a support of the trunk of the robot above the ground. In some embodiments of the present invention, imbalance is specifically detected if the foot of a leg is outside of a shape obtained by projecting on the ground surface an area surrounding the connection point of the leg to the trunk of the robot.

In some embodiments, the imbalance may be employed to detect the imbalance by using machine learning models or non-linear optimization models to detect the imbalance during the task. However, the detection of the imbalance by using the machine learning models or the non-linear optimization models is computationally expensive because of a complexity of the machine learning model or the non-linear optimization model. Further, the complexity of the machine learning model or the non-linear model increase a latency in the tasks, that may decrease a stability of the multi-legged robot.

Hence, some embodiments are based on a realization to detect the imbalance using a geometric approach. The geometric approach overcomes the complexity of the machine learning models and the non-linear optimization models because of a simpler implementation. As a result, the geometric approach decreases the latency in the tasks that may increase the stability of the multi-legged robot.

Hence, some embodiments are based on an objective to detect the imbalance based on measurements of mutual positions of joints of the leg of the plurality of legs. Additionally or alternatively, it is an object of some embodiments to detect the imbalance based on the measurements of mutual positions of the joints of the leg corresponding to a speed defined by the reference trajectory.

Some embodiments are based on a realization that imbalance may be detected based on a position of the foot of the leg of the multi-legged robot that is outside of a shape, for example, an ellipse, a circle, a polygon, and the like, centered on a projection of a position of a hip of the multi-legged robot to the ground. Further, the one or more dimensions of the shape are a function of the speed defined by the reference trajectory.

In addition, some embodiments execute a pre-determined imbalance function to detect the imbalance based on mutual positions of joints of the leg. Additionally, the pre-determined imbalance function may detect an imbalance based on an input including measurements of sensors indicative of the mutual positions of joints of the leg. Further, the measurements of sensors include, but are not limited to, joint angle measurements, joint velocity measurements, joint torques and the like. Further, based on the input, the pre-determined imbalance function generates a binary output to indicate the detection of the imbalance.

Further, after the detection of the imbalance by the pre-determined imbalance function, some embodiments estimate a swing action to correct the detected imbalance. Additionally or alternatively, based on the estimated swing action one or more commands are generated to one or more actuators of the multi-legged robot. Further, based on the one or more commands, the one or more actuators swing the leg to correct the imbalance.

Some embodiments are based on an objective to correct the detected imbalance by moving the foot of the leg in a center of the shape. In some embodiments, based on a velocity of the multi-legged robot, the foot of the leg is moved in an anticipated center of the shape to correct the detected imbalance.

Accordingly, one embodiment discloses a control system for controlling a robot to perform a task, wherein the robot is a legged robot comprising a trunk and a plurality of legs for supporting the trunk above a ground, wherein the control system comprises a processor; and a memory having instructions stored thereon that, when executed by the processor, causes the control system to: collect a reference trajectory defining a sequence of states of the robot in a time and a space to perform the task; execute a stance controller configured to compute and apply reaction forces of the plurality of legs of the robot in a contact with the ground to push the trunk of the robot based on the reference trajectory; and execute a swing controller of a plurality of swing controllers to swing a leg in response to detecting a relative position between the trunk and a foot of the leg of the robot indicative of an imbalance of a support of the trunk of the robot above the ground.

Accordingly, another embodiment discloses a control method for controlling a robot to perform a task, wherein the robot is a legged robot comprising a trunk and a plurality of legs for supporting the trunk above a ground. The method comprises collecting a reference trajectory defining a sequence of states of the robot in a time and a space to perform the task; executing a stance controller configured to compute and apply reaction forces of the plurality of legs of the robot in a contact with the ground to push the trunk of the robot based on the reference trajectory; and executing a swing controller of a plurality of swing controllers to swing a leg in response to detecting a relative position between the trunk and a foot of the leg of the robot indicative of an imbalance of a support of the trunk of the robot above the ground.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
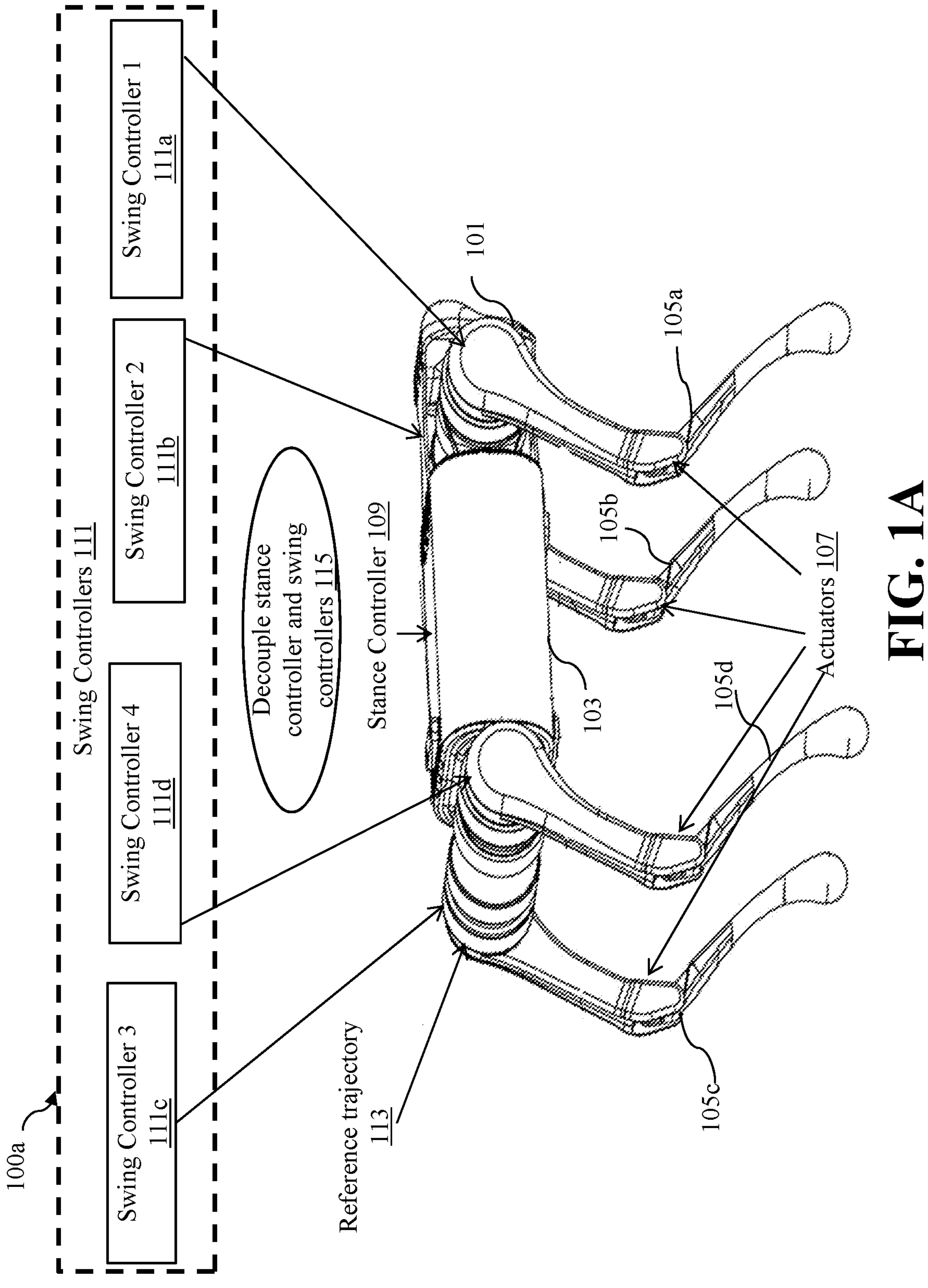
FIG. 1A illustrates a schematic configuration of a multi-legged robot, according to some embodiments of the present disclosure.

FIG. 1A illustrates a schematic configuration 100*a* of a multi-legged robot 101, according to some embodiments of the present disclosure. The multi-legged robot 101 comprises a trunk 103, a plurality of legs, for example, a leg 105*a*, a leg 105*b*, a leg 105*c*, and a leg 105*d*, and one or more actuators 107. The plurality of legs supports the trunk 103 above a ground. For ease of explanation, the multi-legged robot 101 having four legs is considered. However the multi-legged robot 101 may comprise two or more legs. Further, the one or more actuators 107 are shown separately from the multi-legged robot 101. However, the one or more actuators may be integrated within the multi-legged robot 101.

Further, a stance controller 109 is associated with the trunk 103 of the multi-legged robot 101. A plurality of swing controllers (depicted as a swing controller 1, 111*a*, a swing controller 2, 111*b*, a swing controller 3, 111*c*, and a swing controller 4, 111*d*, hereinafter collectively referred to as swing controllers 111) are associated with the plurality of legs. Further, in some embodiments, a respective swing controller of the plurality of swing controllers is associated with a respective leg of the plurality of legs, for example, the swing controller 1, 111*a*, is associated with the leg 105*a*, the swing controller 2, 111*b*, is associated with the leg 105*b*, the swing controller 3, 111*c*, is associated with the leg 105*c*, and the swing controller 4, 111*d*, is associated with the leg 105*d*.

The multi-legged robot 101 is configured to perform a task, for example, a search and rescue task, a warehouse logistics task, an infrastructure inspection task, a security task, and a monitoring task, and the like. In some embodiments, the multi-legged robot 101 is further configured to perform the task based on a reference trajectory 113. In some embodiments, the reference trajectory 113 corresponds to a path defining a motion of the multi-legged robot 101, for performing the task. Further, the reference trajectory 113 defines a sequence of states of the multi-legged robot 101 in time and space to perform the task. In some embodiments, the reference trajectory 113 may define the sequence of states of the multi-legged robot 101 at discrete timestamp corresponding to discrete locations, for example, coordinates of 3D locations in a Cartesian space. Further, in some embodiments, the reference trajectory may define vectors of joint angles for each of leg of the plurality of legs of the multi-legged robot 101. Further, in some embodiment, the reference trajectory 113 may define one or more velocities and one or more accelerations to control the multi-legged robot 101 for performing the task. Further, in some embodiments, the reference trajectory 113 may define the orientation of the multi-legged robot 101 in the time and the space to perform the task. Further, in some embodiments, the reference trajectory may define a current contact force between at least one leg of the plurality of legs and the ground. Further, in some embodiment, the reference trajectory 113 may define a step height for the at least one leg of the plurality of legs.

Some embodiments are based on a realization that there is a need to coordinate and synchronize a trunk motion associated with the trunk 103 of the multi-legged robot 101 and a leg motion of each leg of the plurality of legs to perform the various tasks. Hence, in some embodiments, the reference trajectory 113 may define a motion profile spanning in a multi-dimensional space to coordinate and synchronize the trunk motion associated with the trunk 103 and a leg motion of each leg of the plurality of legs. However, it is computationally expensive and a complex task to determine the motion profile spanning to determine the trunk motion and the leg motion of each leg of the plurality of legs, simultaneously.

To that end, it is an object of some embodiments to decouple 115 stance controller 109 and the plurality of swing controllers. The decoupling 115 allows an independent computation of the trunk motion and the leg motion of each leg of the plurality of legs.

Figure 1B:
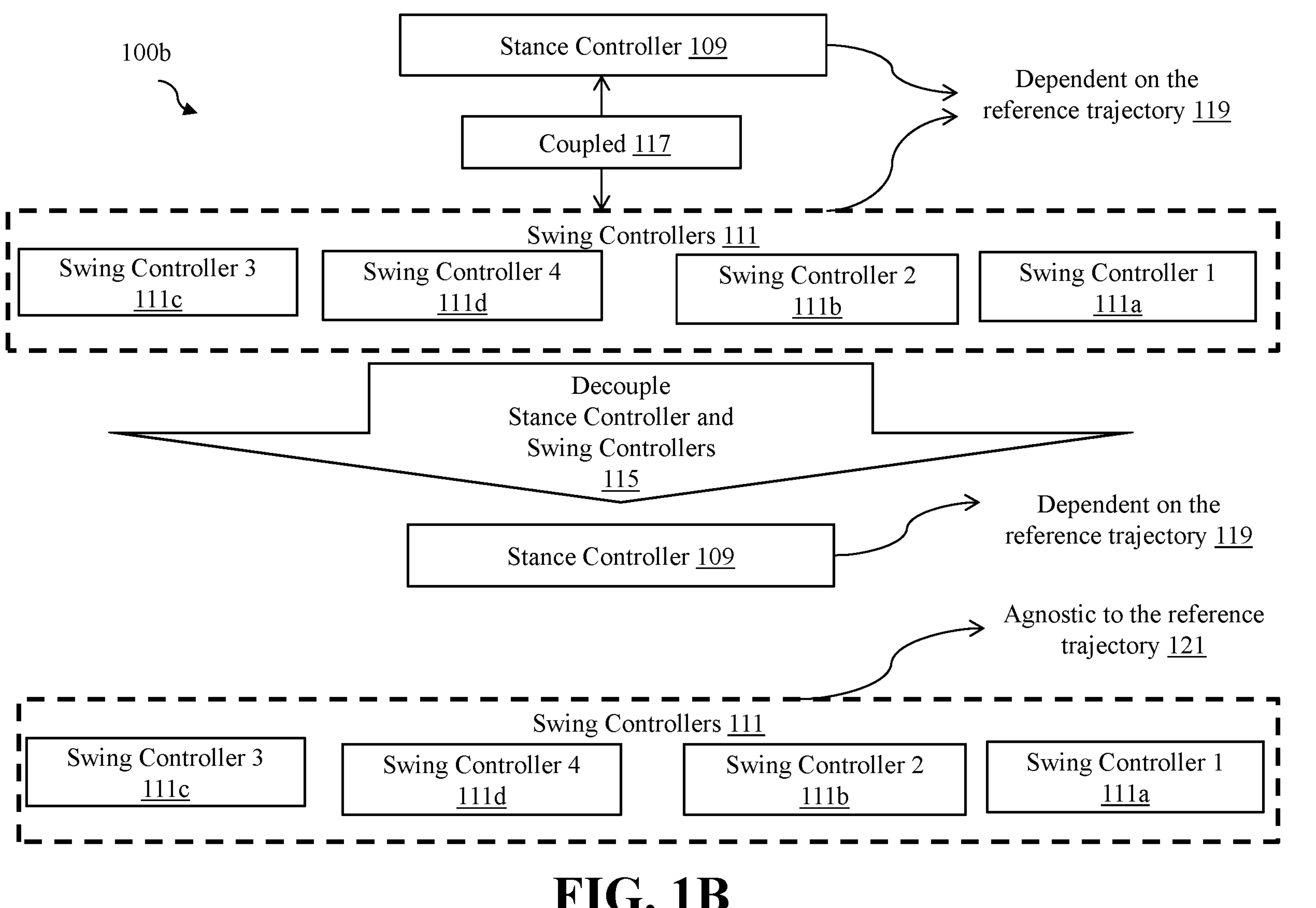
FIG. 1B illustrates a schematic of principles for considering decoupling of a stance controller and swing controllers, according to some embodiments of the present disclosure.

FIG. 1B illustrates a schematic 100*b* of principles for considering decoupling of the stance controller and swing controllers 111, according to some embodiments of the present disclosure.

The schematic 100*b* illustrates the stance controller 109 and the swing controllers 111*a*-111*d* are coupled 117. As a result, the stance controller 109 and the swing controllers 111 are dependent 119 on the reference trajectory 113.

Specifically, in some embodiments, the stance controller 109 and the swing controllers 111 are configured to simultaneously compute reference trajectories based on the reference trajectory 113, for example, a trunk reference trajectory to control the trunk 103 of the multi-legged robot 101 and footstep reference trajectories to control the plurality of legs of the multi-legged robot 101.

However, the simultaneous computation of the reference trajectories for controlling the multi-legged robot 101 in real-time is computationally expensive. Further, the simultaneous computation of the reference trajectories increases an energy consumption, thereby increasing a cost of transportation (COT) and a task completion time. Additionally, it is not practically feasible to pre-determine the trunk reference trajectory and the footstep reference trajectories, as to perform the various tasks, there is a need to perform traversal operations in smooth-surfaced environments or rough-surfaced environments, stabilization operations to stabilize the multi-legged robot 101, and collision prevention operations to prevent unwanted collisions with objects, simultaneously in real-time.

To mitigate such shortcomings, the stance controller 109 and the swing controllers 111 are decoupled 115. Specifically, the swing controllers 111 are decoupled 115 from the stance controller 109 based on an imbalance corresponding to a relative position of the trunk 103 and a foot of the multi-legged robot 101 Hence, the swing controllers 111 are agnostic 121 to the reference trajectory 113. Various embodiments for controlling the multi-legged robot 101 based on the imbalance is described with reference to FIG. 1C, FIG. 3A, FIG. 3B, and FIG. 3C.

Figure 1C:
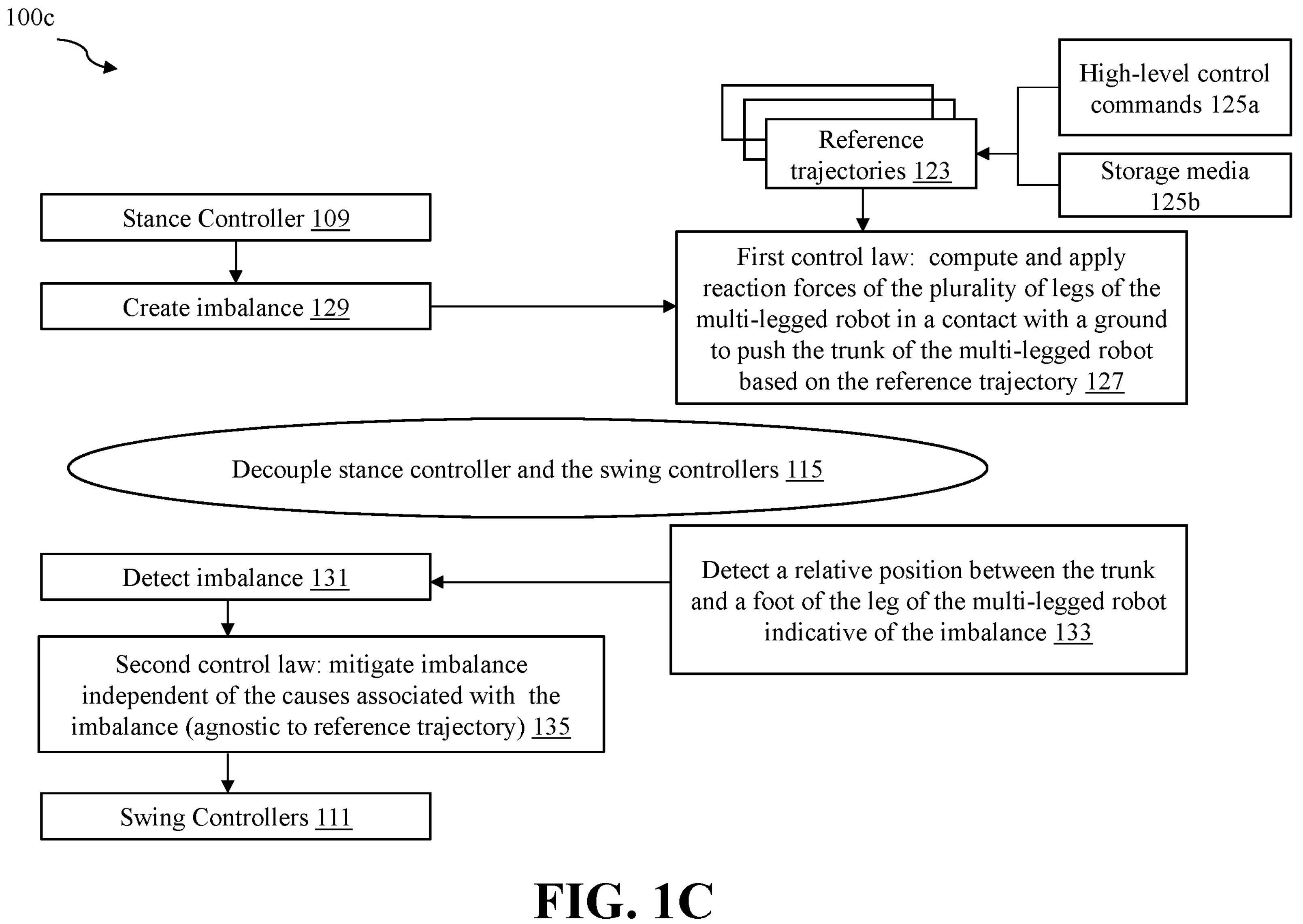
FIG. 1C illustrates a schematic for controlling the multi-legged robot based on the decoupling of the stance controller and the swing controllers, according to some embodiments of the present disclosure.

FIG. 1C illustrates a schematic 100*c* for controlling the multi-legged robot 101 based on the decoupling 115 of the stance controller 109 and the swing controllers 111, according to some embodiments of the present disclosure. The schematic 100*c* illustrates that some embodiments are based on an objective to collect a plurality of reference trajectories 123. The plurality of reference trajectory is collected from at least one: high-level control commands 125*a* or a storage media 125*b* such as a memory or a database.

Further, based on the collected plurality of reference trajectories 123, the stance controller 109 is further configured to apply 127 a first control law. Further, based on the application 127 of the first control law, the stance controller 109 is further configured to compute and apply reaction forces of the plurality of legs of the multi-legged robot 101 in a contact with the ground to push the trunk 103 of the multi-legged robot 101 based on the reference trajectory 113.

Further, the imbalance is created 129 based on the application 127 of the first control law. Further, in some embodiments, the imbalance may be created 129 based on one or a combination of causes, such as uneven terrains, sensor errors, control algorithm errors, external forces, an uneven weight distribution, mechanical errors, and an inadequate gait planning.

Hence, some embodiments are based on a realization to mitigate the imbalance based on the decoupling 115 of the stance controller 109 and the swing controllers 111. The decoupling 115 allows the swing controllers 111 to mitigate the imbalance independent of the plurality of reference trajectories 123. To mitigate the imbalance, some embodiments are based on an objective to detect 131 the imbalance. Further, some embodiments are based on an objective to detect 133 a relative position between the trunk 103 and a foot of the leg, for example, the leg 105*a* of the multi-legged robot 101 indicative the imbalance 131.

Further, based on the detected imbalance, the swing controller 1, 111*a* is further configured to apply 135 a second control law. Further, based on the application 135 of the second control law, the stance controller 1, 111*a* is further configured to mitigate the imbalance independent of the causes associated with the imbalance (agnostic to the reference trajectory 133).

Further, based on such realization the present disclosure provides a system for controlling the multi-legged robot 101 that is described with reference to FIG. 2.

Figure 2:
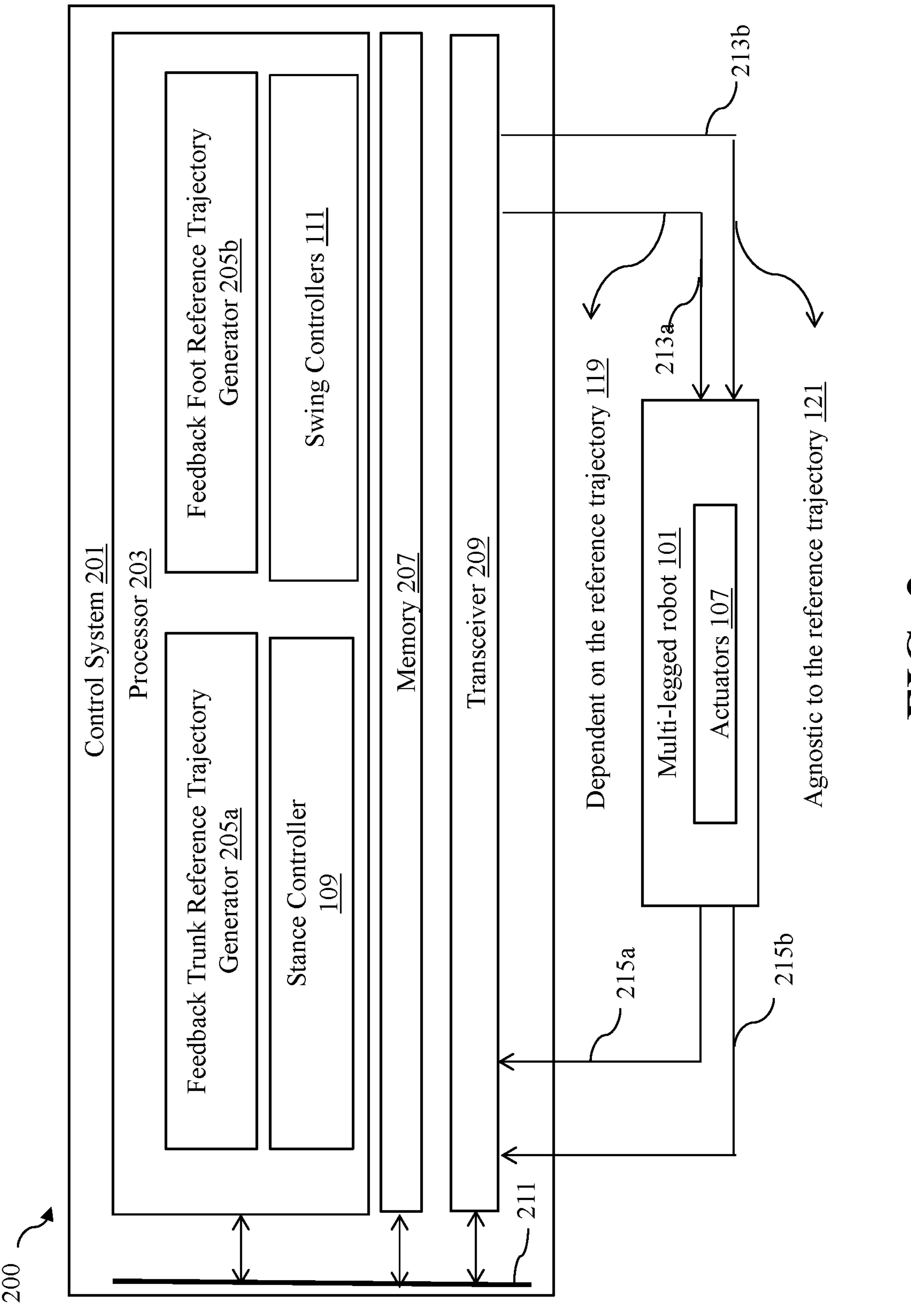
FIG. 2 illustrates a block diagram of a control system for controlling the multi-legged robot, according to some embodiments of the present disclosure.

FIG. 2 illustrates a block diagram 200 of a control system 201 for controlling the multi-legged robot 101, according to some embodiments of the present disclosure. The control system 201 is configured to control the multi-legged robot 101 to perform the task. The control system 201 is coupled to the multi-legged robot 101. In some embodiments, the control system 201 may be integrated within the multi-legged robot 101:

The control system 201 comprises a processor 203, a memory 207, a transceiver 209, and a bus 211. The memory 207 may be embodied as a storage media. The storage media may include one or a combination of a RAM (Random Access Memory), a ROM (Read Only Memory), a hard disk, and the like. The memory 207 may store instructions that are executable by at least one processor, for example, the processor 203. The at least one processor, for example, the processor 203 may be embodied as a single core configuration, or a multi-core configuration, for example, a computing cluster. The processor 203 is coupled to the memory 207 and/or the transceiver 209 via the bus 211.

Further, the processor 203 comprises an internal memory to store one or more controllers, for example, the stance controller 109, the swing controllers 111, and one or more feedback reference trajectory generators, for example, a feedback trunk reference trajectory generator 205*a*, and a feedback foot reference trajectory generator 205*b*. In some embodiments, the one or more controllers and the one or more feedback reference trajectory generators may be embodied outside the control system 201 and may communicate with the controls system 201 via a communication network. The one or more controllers may correspond to one or a combination of a proportional integral derivative (PID) controller, an optimal controller, a neural network controller, and the like. In some embodiments, the one or more controllers may be referred to as "one or more feedback controllers". Further, the one or more feedback reference trajectory generators are coupled to the one or more controllers.

In some embodiments, the stance controller 109 is further configured to collect the reference trajectory 113. Further, based on the collected reference trajectory 113, the stance controller 109 is further configured to determine the sequence of control inputs 213*a* to control the one or more actuators 107 of the multi-legged robot 101. As a result, the sequence of control inputs 213*a* is dependent 119 on the reference trajectory 113. Further, the stance controller 109 is configured to determine the sequence of control inputs 213*a* to change the state of the multi-legged robot 101 by pushing the trunk 103 based on the reference trajectory 113. Additionally or alternatively, the transceiver 209 is configured to transmit the sequence of control inputs 213*a* to the one or more actuators 107 to push the trunk 103 of the multi-legged robot 101. In some embodiments, the transceiver 209 may correspond to a radio-frequency transceiver (RF).

Further, in some embodiments, the at least one swing controller, for example, the swing controller 1, 111*a* of the swing controllers 111 is configured to detect the relative position between the trunk 103 and a foot of the leg 105*a* of the multi-legged robot 101 indicative of the imbalance. Further, based on the detected imbalance, the at least one swing controller is further configured to determine the sequence of control inputs 213*b* to control the one or more actuators 107 of the multi-legged robot 101. As a result, the sequence of control inputs 213*b* is agnostic 121 to the reference trajectory 113. Further, the at least one swing controller of the swing controllers 111 is further configured to determine the sequence of control inputs 213 change the state of the multi-legged robot 101 by swinging at least one leg, for example, the leg 105*a* of the multi-legged robot 101. The transceiver 209 is further configured to transmit the sequence of control inputs 213*b* to the one or more actuators 107 to swing the at least one leg, for example, the leg 105*a* based on the detected imbalance. Additionally or alternatively, the transceiver 209 is configured to transmit the sequence of control inputs 213*b* to the one or more actuators 107 to swing the at least one leg, for example the leg 105*a* of the multi-legged robot 101.

Further, the sequence of control inputs 213*a* and the sequence of control inputs 215*b* may be associated with physical quantities such as voltages, pressures, forces, torques, and the like. In some embodiments, the sequence of control inputs 213*a* and the sequence of control inputs 213*b* may correspond to the trunk reference trajectory and the footstep the reference trajectories, respectively.

Further one or more sensors of the multi-legged robot 101 are configured to measure the change of the state of the multi-legged robot 101 associated with the sequence of control inputs 213*a* and the change of the state of the multi-legged robot 101 associated with the sequence of control inputs 213*b*. Further, based on the measured change of the state of the multi-legged robot 101 associated with the sequence of control inputs 213*a*, the one or more sensors are configured to generate a feedback signal 215*a*. Further, based on the measured change of the state of the multi-legged robot 101 associated with the sequence of control inputs 213*b*, the one or more sensors are further configured to generate a feedback signal 215*b*. The one or more sensors are further configured to transmit the feedback signal 215*a* and the feedback signal 215*b* to the transceiver 209. The feedback signal 215*a* and the feedback signal 215*b* includes a sequence of measurements corresponding to the sequence of control inputs 213*a*, and the sequence of control inputs 213*b*, respectively. The sequence of measurements may be measurements of the state of the multi-legged robot 101 in accordance with the sequence of control inputs 213*a* and the sequence of control inputs 213*b*.

Further, each measurement of the sequence of measurements may be indicative of the state of the multi-legged robot 101 corresponding to the sequence of control inputs 213*a* and the sequence of control inputs 213*b*. Additionally, each measurement of the sequence of measurements may be associated physical quantities.

Accordingly, the control system 201 is further configured to iteratively transmit the sequence of control inputs 213*a* and the sequence of control inputs 213*b* and receive the feedback signal 215*a* and the feedback signal 215*b*, respectively. In some embodiments, the control system 201 is further configured to determine the sequence of control inputs 213*a* in a current iteration based on the feedback signal 215*a*. Further, the control system 201 is further configured to determine the sequence of control inputs 213*b* in the current iteration based on the feedback signal 215*b*. Specifically, to determine the sequence of control inputs 213*a* in the current iteration, the stance controller 109 are configured to determine, at each control step, a first current control input for controlling the multi-legged robot 101, based on the feedback signal 215*a*. Further, to determine the sequence of control inputs 213*b* in the current iteration, the at least one swing controller of the swing controllers 111 is configured to determine, at each control step, a second current control input for controlling the multi-legged robot 101, based on the feedback signal 215*b*. Further, the feedback signal 215*a* includes a first current measurement of the current state of the multi-legged robot 101. Further, the feedback signal 215*b* includes a second current measurement of the current state of the multi-legged robot 101.

In some embodiments, to determine the first current control input, the stance controller 109 is further configured to apply a control policy to the sequence of control inputs 213*a*. Further, to determine the second control input, the at least one swing controller of the swing controllers 111 is configured to apply the control policy to the sequence of control input 213*b*. The control policy may correspond to a set of mathematical equations that map all or a subset of states of the multi-legged robot 101 to the sequence of control inputs 213*a* and the sequence of control inputs 213*b*. The mapping can be analytical or based on a solution to an: optimization problem. The control policy minimizes a difference between a desired state of the multi-legged robot and the current state of the multi-legged robot 101.

Based on values of parameters of feedback trunk reference trajectory generated by the feedback trunk reference trajectory generator 205*a*, the stance controller 109 is further configured to apply the control policy to transform the first current measurement of the current state to the first current control input. Further, based on values of parameters of the feedback footstep reference trajectories generated by the feedback foot reference trajectory generator 205*b*, the at least one swing controller of the swing controllers 111 is configured to apply the control policy to transform the second current measurement of the current state to the second current control input. As used herein, parameters of the feedback trunk reference trajectory and the feedback footstep reference trajectories include, but are not limited to a desired walking speed of the multi-legged robot 101, a desired step height of the foot of the multi-legged robot 101, a desired rotational velocity of the multi-legged robot 101, and the like.

Accordingly, controlling of the multi-legged robot 101 by the control system 201 is described with reference to FIG. 3A, FIG. 3B, and FIG. 3C.

Figure 3A:
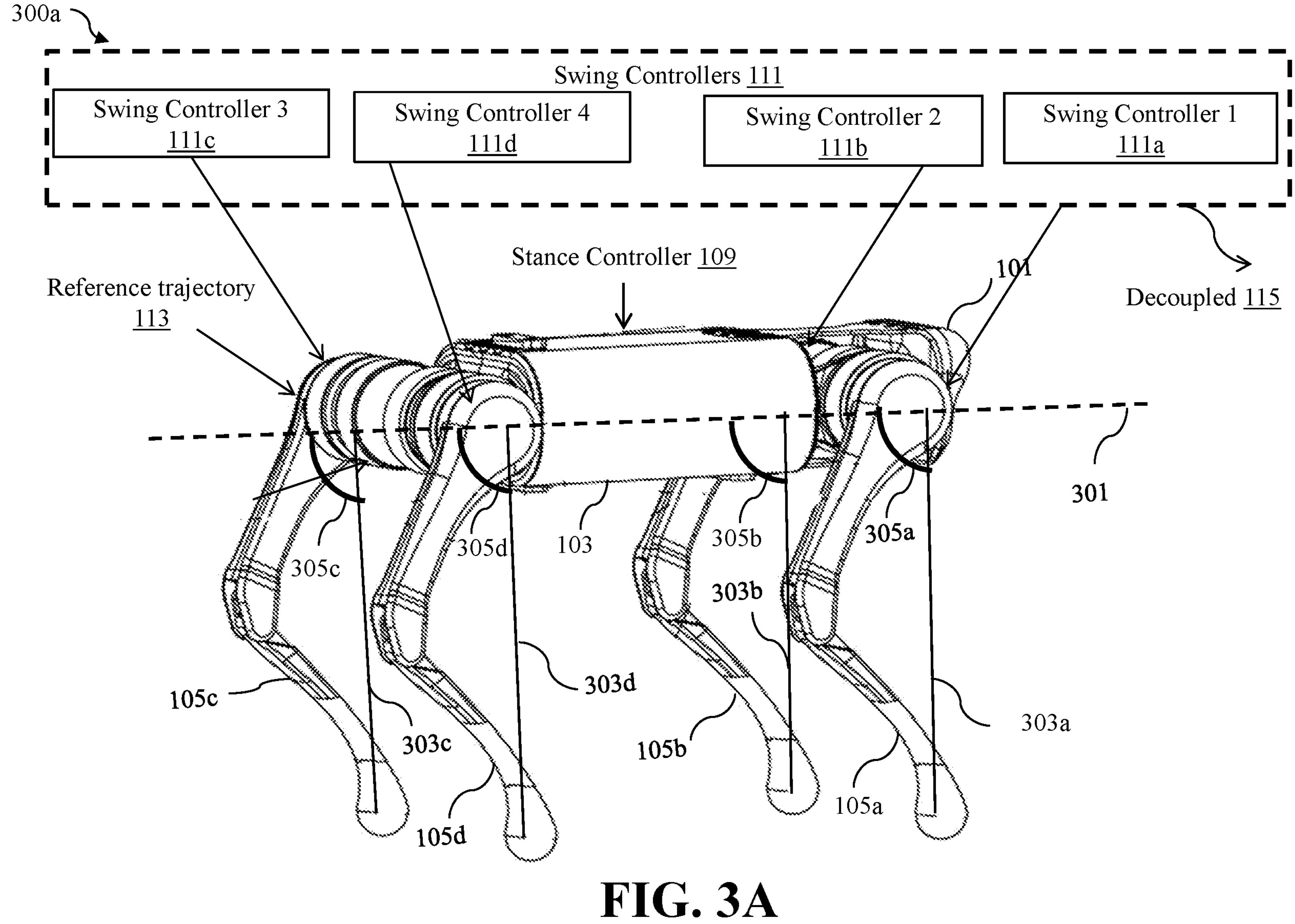
FIG. 3A illustrates a schematic for collecting a reference trajectory, according to some embodiments of the present disclosure.

FIG. 3A illustrates a schematic 300*a* for collecting the reference trajectory 113, according to some embodiments of the present disclosure. The schematic 300*a* includes a robot's center of mass (COM) 301, a plurality of foot positions, for example, a foot position 303*a*, a foot position 303*b*, a foot position 303*c*, and a foot position 303*d*, a plurality of joint angles, for example a joint angle 305*a*, a joint angle 305*b*, a joint angle 305*c*, and a joint angle 305*d*.

Further, each foot position of the plurality of foot positions is associated with the respective leg of the plurality of legs, for example, the foot position 303*a* is associated with the leg 105*a*, the foot position 303*b* is associated with the leg 105*b*, the foot position 303*c* is associated with the leg 105*c*, and the foot position 303*d* is associated with the leg 105*d*. Additionally, each foot position of the plurality of foot positions may change based on a change of a respective joint angle of the plurality of joint angles. Further, the respective joint angle may be defined based on a respective foot position and the robot's COM 301, for example, the joint angle 305*a* is defined based on the foot position 303*a* and the robot's COM 301, the joint angle 305*b* is defined based on the foot position 303*b* and the robot's COM 301, the joint angle 305*c* is defined based on the foot position 303*c* and the robot's COM 301, and the joint angle 305*d* is defined based on the foot position 303*d* and the robot's COM 301.

Further, as illustrated by FIG. 3A, the processor 203 is configured to collect the reference trajectory 113 to perform the task. In some embodiments, the collected reference trajectory may correspond to a reference body state. Based on the collected reference trajectory 113, the processor 203 is further configured to change the current state of the multi-legged robot 101 to perform the task.

Further, based on the collected reference trajectory 113, the processor 203 is further configured to execute the stance controller 109.

Figure 3B:
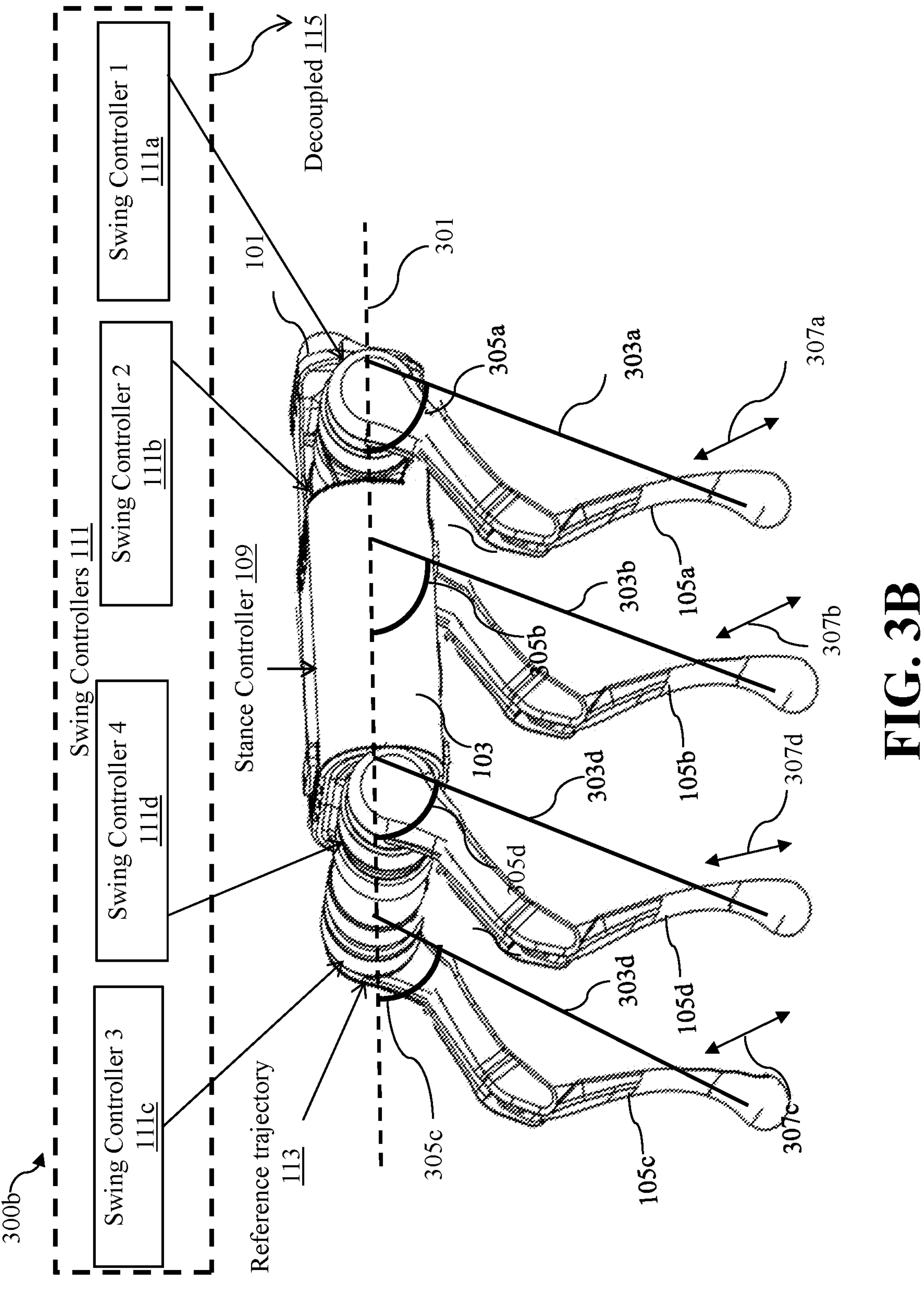
FIG. 3B illustrates a schematic for executing the stance controller, according to some embodiments of the present disclosure.

FIG. 3B illustrates a schematic 300*b* for executing the stance controller 109, according to some embodiments of the present disclosure. The schematic 300*b* illustrates that the processor 203 is further configured to compute and apply reaction forces of the plurality of legs of the multi-legged robot 101 in contact with the ground to push the trunk 103 to follow the reference trajectory 113. Further, the ground reaction forces are associated with the respective leg of the plurality of legs, for example, a ground reaction force 307*a* is associated with the leg 105*a*, a ground reaction force 307*b* is associated with the leg 105*b*, a ground reaction force 307*c* is associated with the leg 105*c*, and a ground reaction force 307*d* is associated with the leg 105*d*.

Further, based on the execution of the stance controller 109, the processor 203 is further configured to execute a swing controller, such as the swing controller 1, 111*a*, of the plurality of the swing controllers 111*a*-111*d*.

Figure 3C:
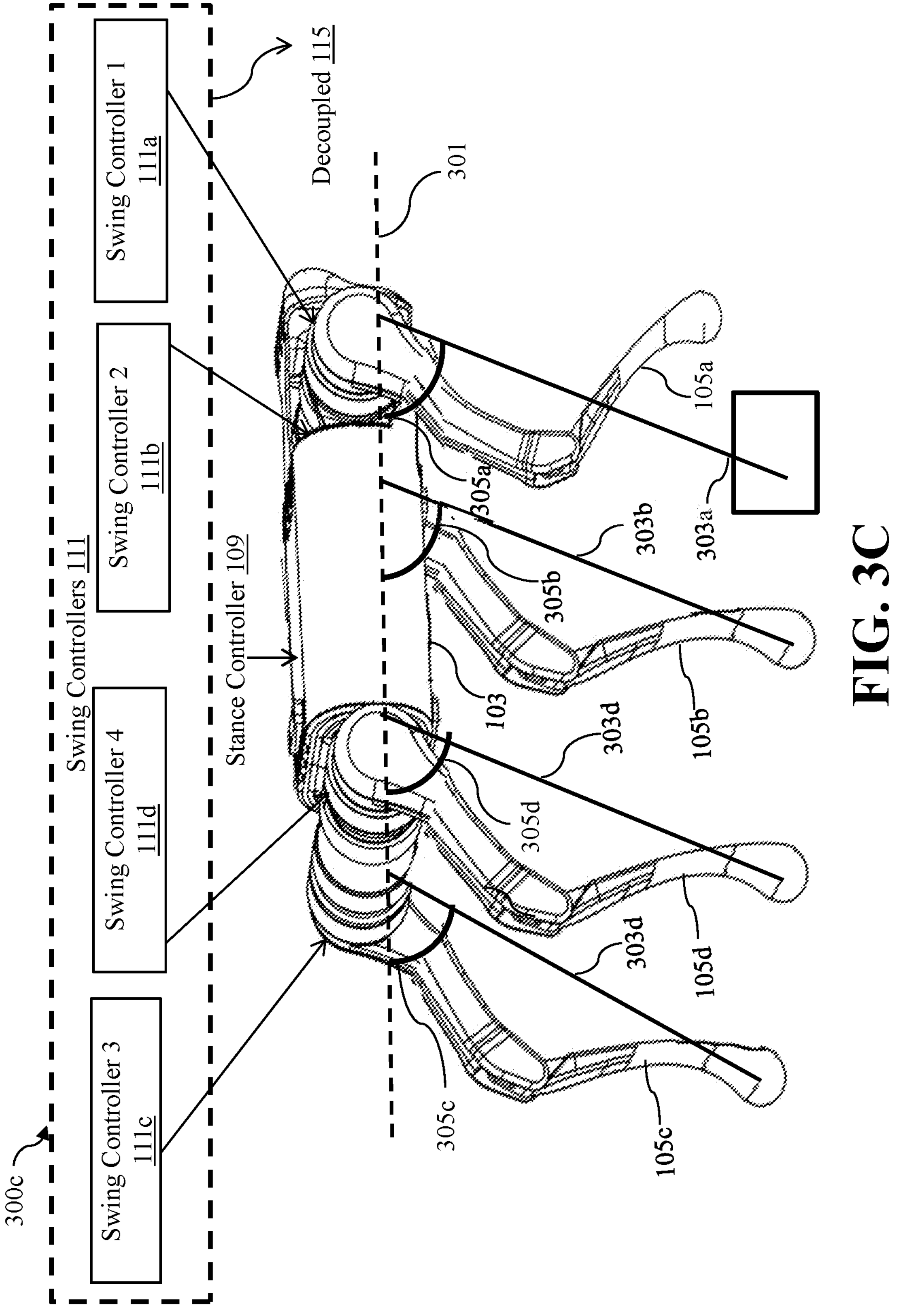
FIG. 3C illustrates a schematic for executing the swing controller, according to some embodiments of the present disclosure.

FIG. 3C illustrates a schematic 300*c* for executing the swing controller 1, 111*a*, according to some embodiments of the present disclosure. The schematic 300*c* illustrates that the processor 203 is configured to execute the swing controller 1, 111*a*, to swing the leg 105*a* in response to detecting the relative position, for example, the foot position 303*a* between the trunk 103 and a foot of the leg 105*a* indicative of the imbalance of the support of the trunk 103 of the multi-legged robot 101 above the ground. In some embodiments, the processor 203 is further configured to detect the imbalance based on measurements of mutual positions of joints of the leg 105*a* of the plurality of legs Accordingly, a flowchart of the execution of the swing controller 1, 111*a*, is described with reference to FIG. 4A.

Figure 4A:
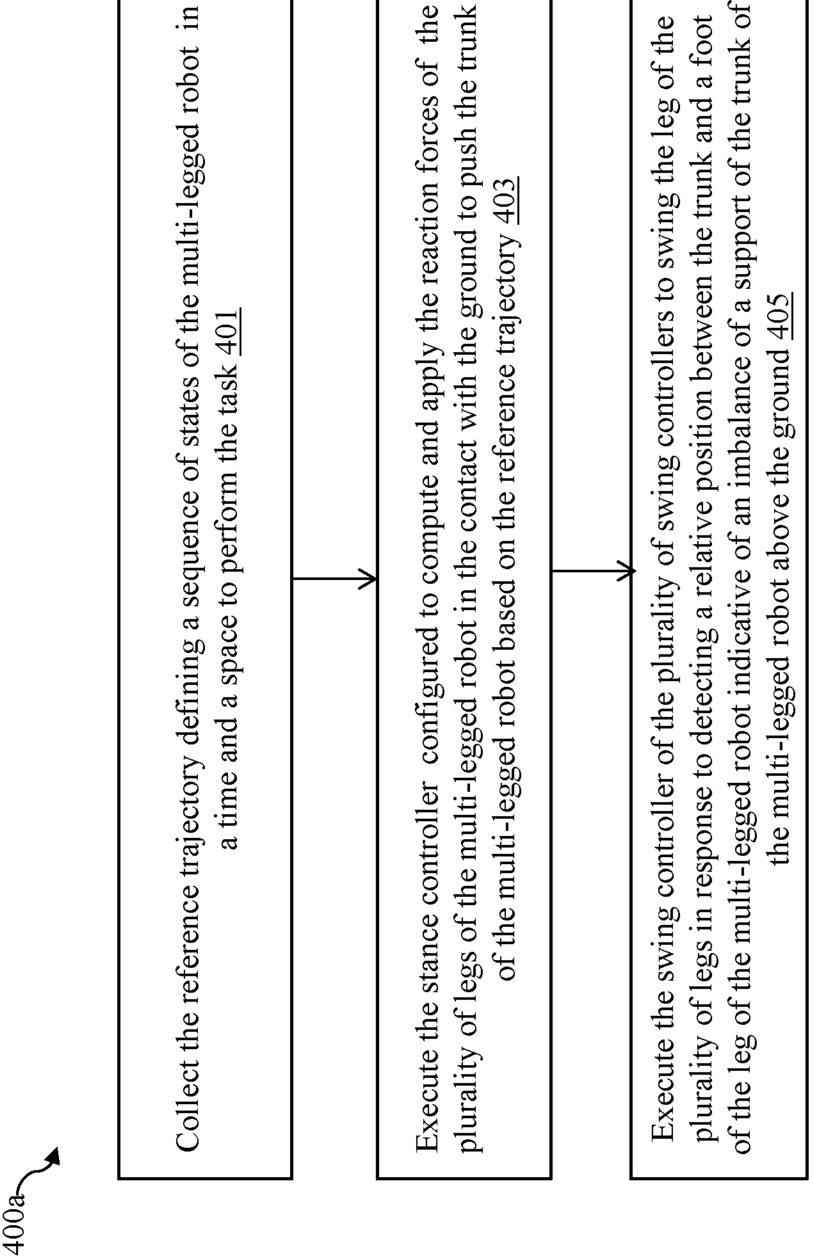
FIG. 4A illustrates a flowchart of execution of the swing controller, according to some embodiments of the present disclosure.

FIG. 4A illustrates a flowchart of a method 400*a* for the execution of the swing controller 1, 111*a*, in accordance with an example embodiment. In one or more embodiments, the control system 201 may perform one or more portions of the method 400*a* and may be implemented in, for instance the processor 203. As such, the control system 201 may provide means for accomplishing embodiments of other process described herein in conjunction with other components of the system 201. Although the method 400*a* is illustrated as a sequence of steps, its contemplated that various embodiments of the method 400*a* may be performed in any order or combination and need not include all of the illustrated steps.

At block 401, the reference trajectory 113 is collected to define the sequence of states of the multi-legged robot 101 in the time and the space to perform the task.

At block 403, based on the collected reference trajectory 113, the stance controller is executed to control the trunk 103 of the multi-legged robot 101. Specifically, the stance controller 109 is configured to control the trunk 103 to follow the reference trajectory 113.

At block 405, based on the execution of the stance controller 109, the swing controller 1, 111*a*, is executed to swing the leg 105*a*. Specifically, the swing controller 1, 111*a*, is configured to swing the leg 105*a* to follow the reference trajectory 113.

Various embodiments for executing the swing controller 1 111*a* is described with reference to FIG. 4B, FIG. 4C and FIG. 4D.

Figure 4B:
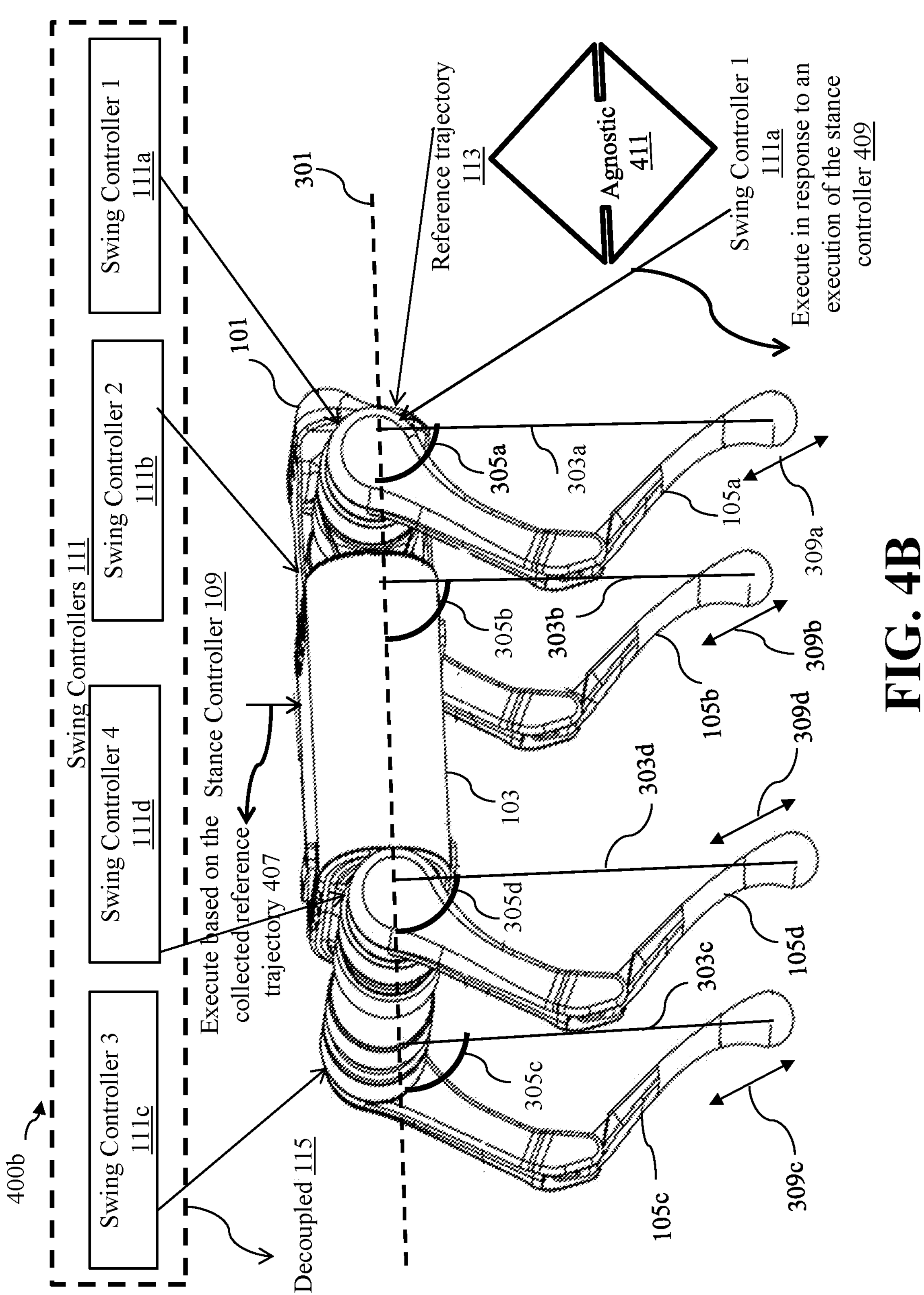
FIG. 4B illustrates a schematic for executing the swing controller, according to some embodiments of the present disclosure.

FIG. 4B illustrates a schematic 400*c* for executing the swing controller 1, 111*a*, according to some embodiments of the present disclosure. The schematic 400*c* illustrates the processor 203 is configured to execute 407 the stance controller 109 based on the collected reference trajectory 113. The stance controller 109 is further configured to control the trunk 103 of the multi-legged robot 101 based on a change of the space commanded by the reference trajectory 113. Additionally or alternatively, the stance controller 109 is further configured to change a position of the trunk 103 to follow the reference trajectory. Further, the processor 203 is further configured to execute 409 the swing controller 1 111*a* in response to the execution 407 of the stance controller 109. As a result, the swing controller 1 111*a* is agnostic 411 to the change of the space commanded by the reference trajectory. Further, in response to the execution 409 of the stance controller 109, the processor 203 is configured to execute 409 the swing controller 1, 111*a*, to swing the leg 105*a*.

Some embodiments are based on an objective to execute the swing controller 1, 111*a*, based on the imbalance. In some embodiments, the processor 203 is configured to detect the imbalance based on the measurements of mutual positions of joints of the leg of the plurality of legs corresponding to a speed defined by the reference trajectory 113. Accordingly, a flowchart for detecting the imbalance is described with reference to FIG. 4D.

Figure 4C:
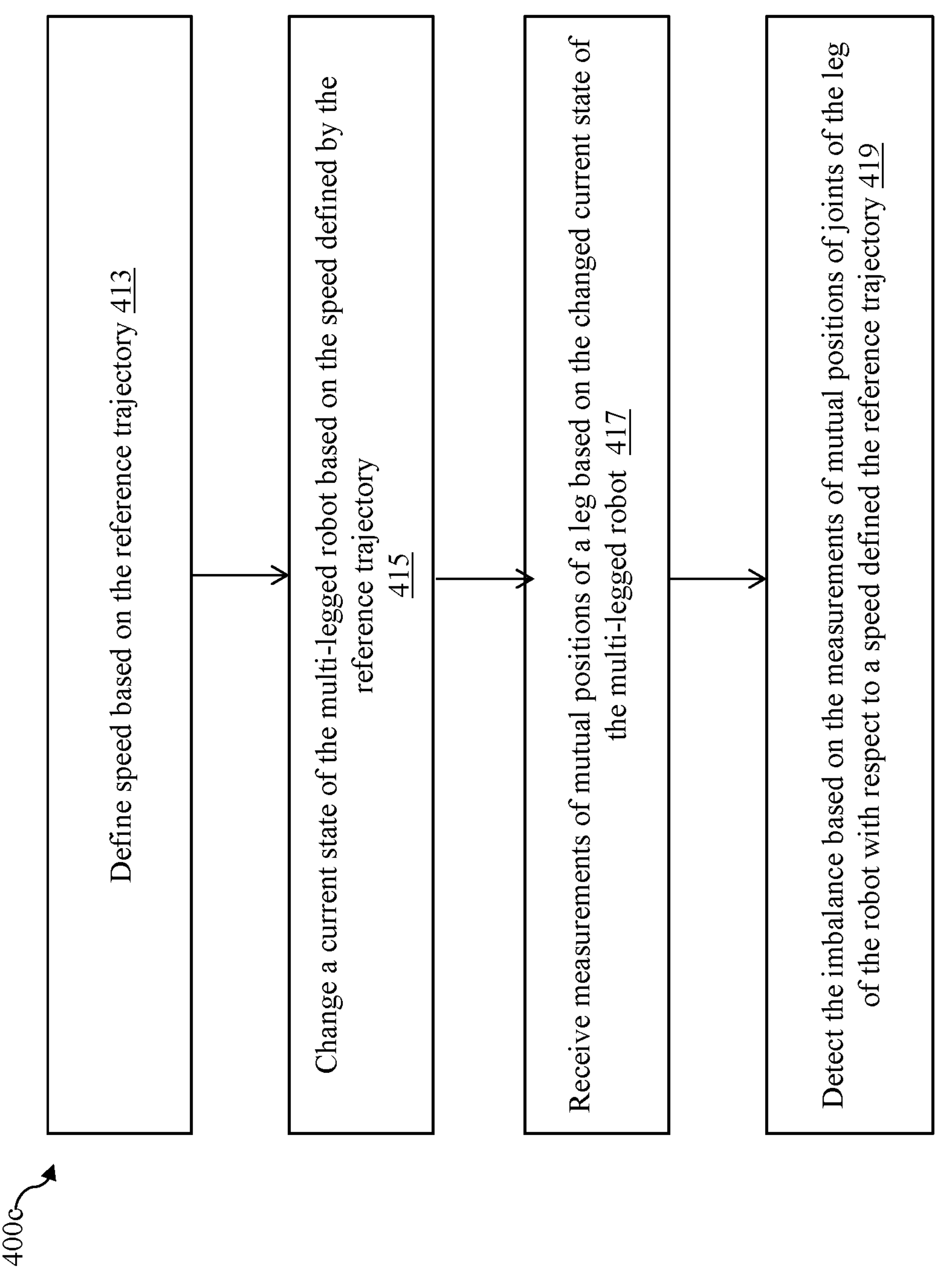
FIG. 4C illustrates a flowchart for detecting an imbalance, according to some embodiments of the present disclosure.

FIG. 4C illustrates a flowchart of a method 400*c* for detecting the imbalance, according to some embodiments of the present disclosure. In one or more embodiments, the control system 201 may perform one or more portions of the method 400*c* and may be implemented in, for instance, the processor 203. As such, the control system 201 may provide means for accomplishing embodiments of other process described herein in conjunction with other components of the system 201. Although the method 400*c* is illustrated as a sequence of steps, it is contemplated that various embodiments of the method 400*c* may be performed in any order or combination and need not include all of the illustrated steps.

At block 413, the speed is defined by the reference trajectory 113. In some embodiments, the speed is defined based on a speed parameter associated with the reference trajectory 113. Further, the multi-legged robot 101 is further configured to follow the reference trajectory 113 based on the speed defined by the reference trajectory. Further, based on the defined speed, the multi-legged robot 101 is further configured to follow the reference trajectory 113 to perform the task.

At block 415, the current state of the multi-legged robot 101 is changed, for example, by swinging the leg 105 of the multi-legged robot 101, based on the speed defined by the reference trajectory 113.

At block 417, the measurements of mutual positions of joints of the leg 105*a* of the plurality of legs are received based on the changed current state of the multi-legged robot 101. In some embodiments, based on the changed current state of the multi-legged robot 101, the measurements of mutual positions of joints of the leg are received as the feedback signal 215 transmitted by the one or more sensors.

At block 419, the imbalance is detected, based on the received measurements of mutual positions of joints of the leg 105*a* of the multi-legged robot 101 corresponding to the speed defined by the reference trajectory 113. Various embodiments for detecting the imbalance based on the received measurements of mutual positions of joints of the leg of the multi-legged robot 101 are described with reference to FIG. 5A, FIG. 5B, FIG. 5C, and FIG. 5D.

Some embodiments are based on an objective to execute the swing controller 1, 111*a*, in response to the execution of the stance controller 109 and the detected imbalance.

Figure 4D:
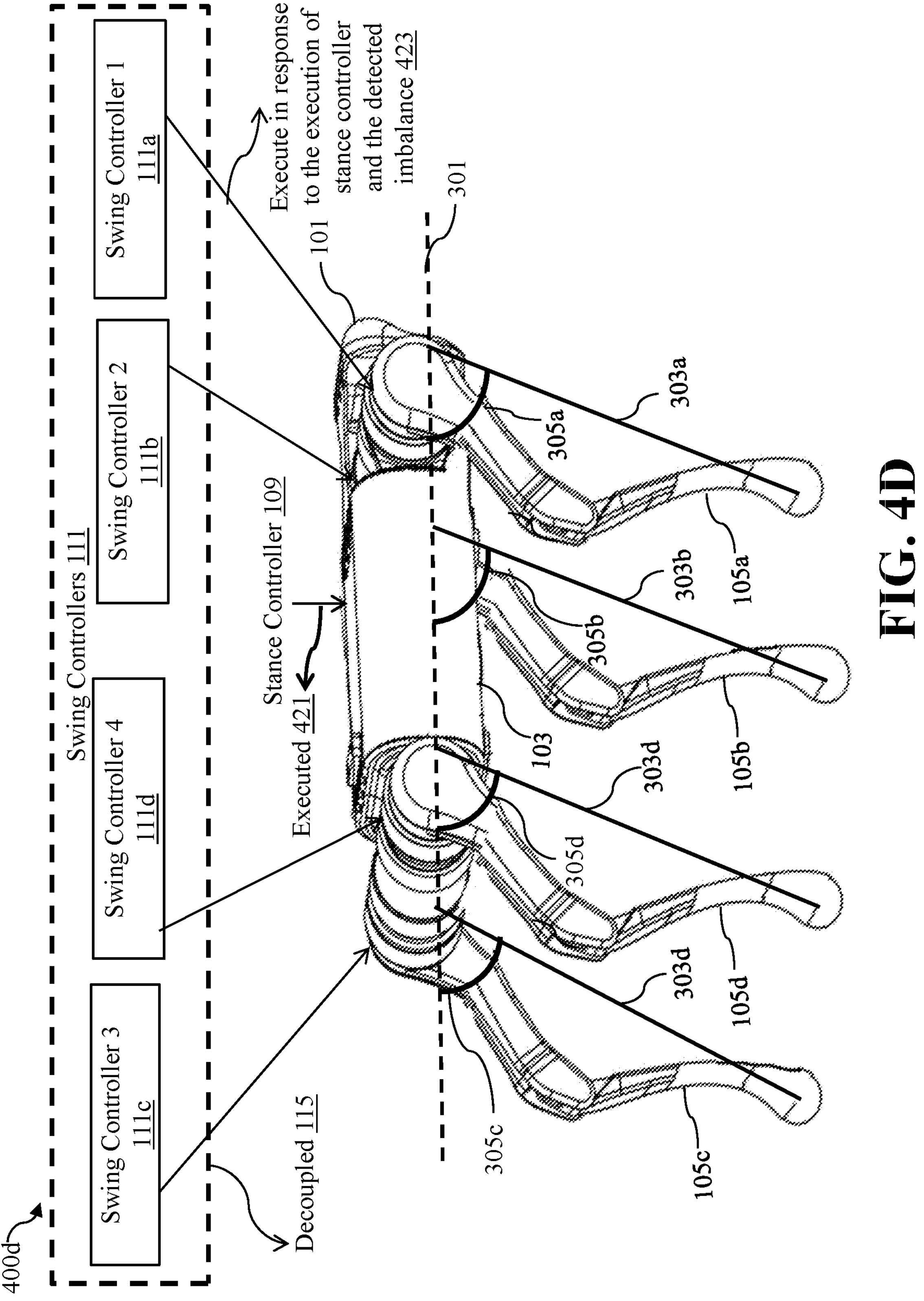
FIG. 4D illustrates a schematic for executing the swing controller, according to some embodiments of the present disclosure.

FIG. 4D illustrates a schematic 400*d* for executing the swing controller 1, 111*a*, according to some embodiments of the present disclosure. The schematic 400*e* illustrates that the stance controller 109 is executed 421 based on the reference trajectory 113. Additionally, the execution 421 of the stance controller 109 change the current state of the multi-legged robot 101 based on the speed defined by the reference trajectory 113. The processor 203 is further configured to receive the measurements of mutual positions of the leg 105*a* of the multi-legged robot 101. The processor is further configured to detect the imbalance based on the measurements of mutual positions of joints of the leg 105*a* of the multi-legged robot 101 with respect to the speed defined by the reference trajectory 113. Further, the processor 203 is further configured to execute 423 the swing controller 1, 111*a*, in response to the execution 421 of the stance controller 109 and the detected imbalance.

Further, in some embodiments, the processor 203 is configured to detect the imbalance based on a pre-determined imbalance function. Additionally or alternatively, the pre-determined imbalance function may be referred to as "imbalance function". Various embodiments for detecting the imbalance based on the imbalance function are described with reference to FIG. 5A, FIG. 5B, FIG. 5C, and FIG. 5D.

Figure 5A:
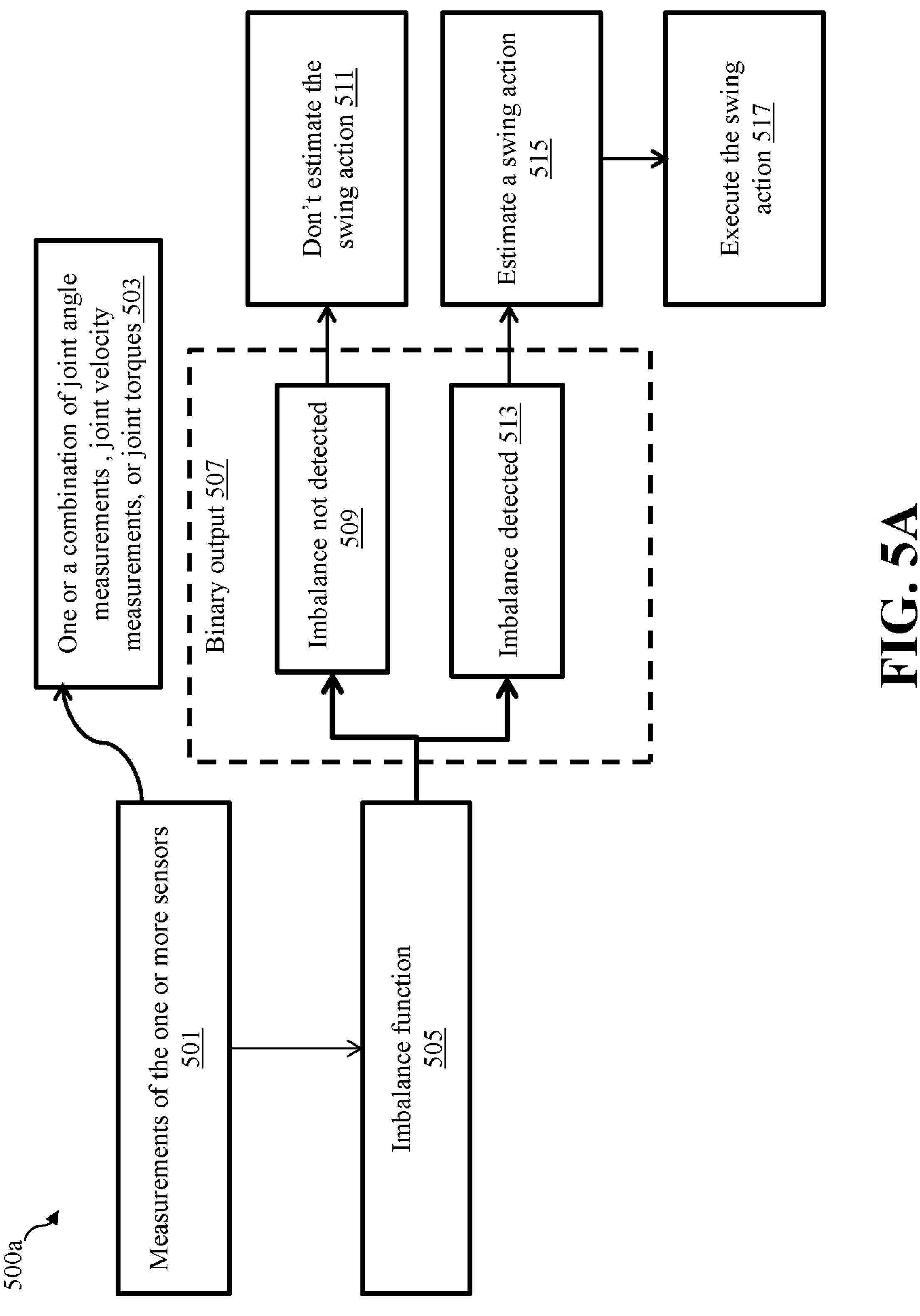
FIG. 5A illustrates a schematic for executing the swing controller based on an imbalance function, according to some embodiments of the present disclosure.

FIG. 5A illustrates a schematic 500*a* for executing a swing controller, such as the swing controller 1, 111*a*, based on an imbalance function 505, according to some embodiments of the present disclosure.

The schematic 500*a* illustrates an input to the imbalance function 505. The input includes measurements of the one or more sensors 501 indicative of the mutual position of joints of a leg of the multi-legged robot 101, such as the leg 105*a*. The measurement of the one or more sensors 501 includes one or a combination of joint angle measurements, joint velocity measurements, or joint torques 503. Further, based on the imbalance function 505, the processor 203 is further configured to generate a binary output 507. The binary output 507 of the imbalance function 505 indicates whether the imbalance is not detected 509 or the imbalance is detected 513. If the imbalance is detected 513, the processor 203 is configured to estimate a swing action 515 for correcting the imbalance. Further, based on the estimation of the swing action 515, the processor 203 is configured to generate one or more commands to the one or more actuators 107 associated with the plurality of legs. Further, based on the generated one or more control commands, the processor 203 is configured to execute the swing action 517. Further, if the imbalance is not detected 509, the swing action is not estimated 511.

Some embodiments are based on a realization that imbalance function 505 may detect the imbalance based on a shape centered on a projection of a hip position to the ground. Specifically, the imbalance function 505 detects the imbalance corresponding to at least one foot position that is outside of the shape centered on the projection of the hip position to the ground. Additionally, the shape may correspond to at least one of a circle, a square, an ellipse, and the like. Various embodiments for detecting the imbalance based on the shape centered on the projection of the hip position to the ground are described with reference to FIG. 5C and FIG. 5D.

Accordingly, an example embodiment for defining one or more dimensions of the shape is described with reference to FIG. 5B.

Figure 5B:
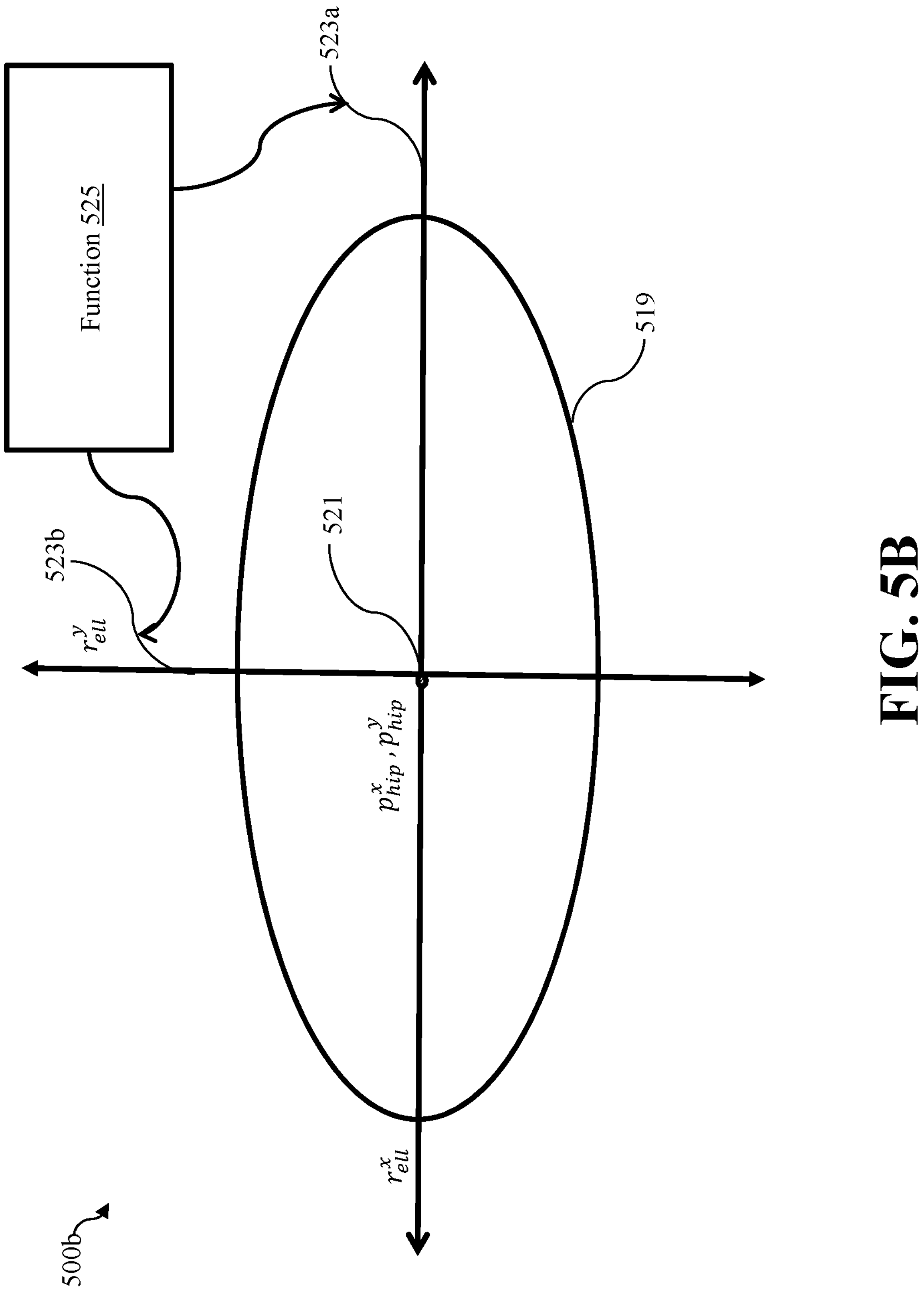
FIG. 5B illustrates a schematic for defining one or more dimensions of a shape, based on a speed function, according to some embodiments of the present disclosure.

FIG. 5B illustrates a schematic 500*b* for defining one or more dimensions of a shape 519, based on a function 525, according to some embodiments of the present disclosure. The schematic 500*b* illustrates the one or more dimensions, for example, a major axis $$r_{ell}^{x}$$

523*a* and a minor axis $$r_{ell}^{y}$$

523*b* of the shape 519 is the function 525 of the speed defined by the reference trajectory 113. In some embodiments, the shape 519 may be referred to as "region of safe foot placement".

Further, the processor 203 is further configured to detect the imbalance based on a respective foot position associated with the respective leg on the ground that is outside of the shape 519 centered on a projection of the hip $$p_{hip}^{x}, p_{hip}^{y}$$

521 of the respective leg to the ground. Various embodiments for detecting the imbalance based on the imbalance function are described with reference to FIG. 5C and FIG. 5D.

Figure 5C:
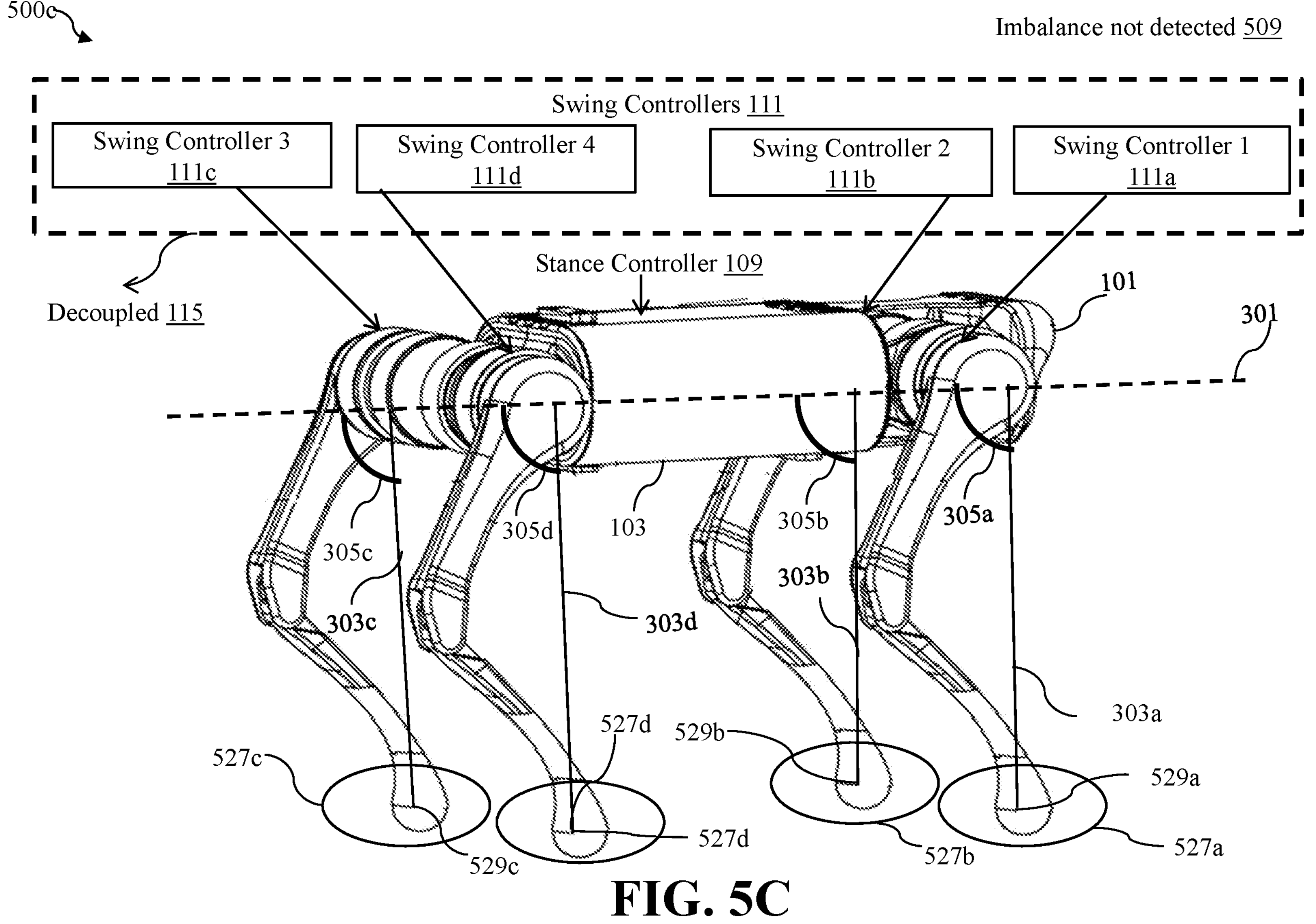
FIG. 5C illustrates a schematic for detecting the imbalance based on a projection of the shape, according to some embodiments of the present disclosure.

FIG. 5C illustrates a schematic 500*c* for detecting the imbalance based on the imbalance function 505, according to some embodiments of the present disclosure. The schematic 500*c* illustrates that each foot position of the multi-legged robot 101 is inside of a respective shape that is centered on a respective projection of the hip position to the ground. Specifically, the foot position 303*a* associated with the leg 105*a* is inside of a shape 527*a* centered on a projection of a hip position 529*a* to the ground, the foot position 303*b* associated with the leg 105*b* is inside of a shape 527*b* centered on a projection of a hip position 529*b* to the ground, the foot position 303*c* associated with the leg 105*c* is inside of a shape 527*c* centered on a projection of a hip position 529*c* to the ground, and the foot position 303*d* associated with the leg 105*d* is inside of a shape 527*d* centered on a projection of a hip position 529*d* to the ground. Further, based on a determination that each foot position of the multi-legged robot 101 is inside of a respective shape centered on a respective projection of a respective hip position to the ground, the imbalance function 505 indicates the imbalance not detected 513.

Figure 5D:
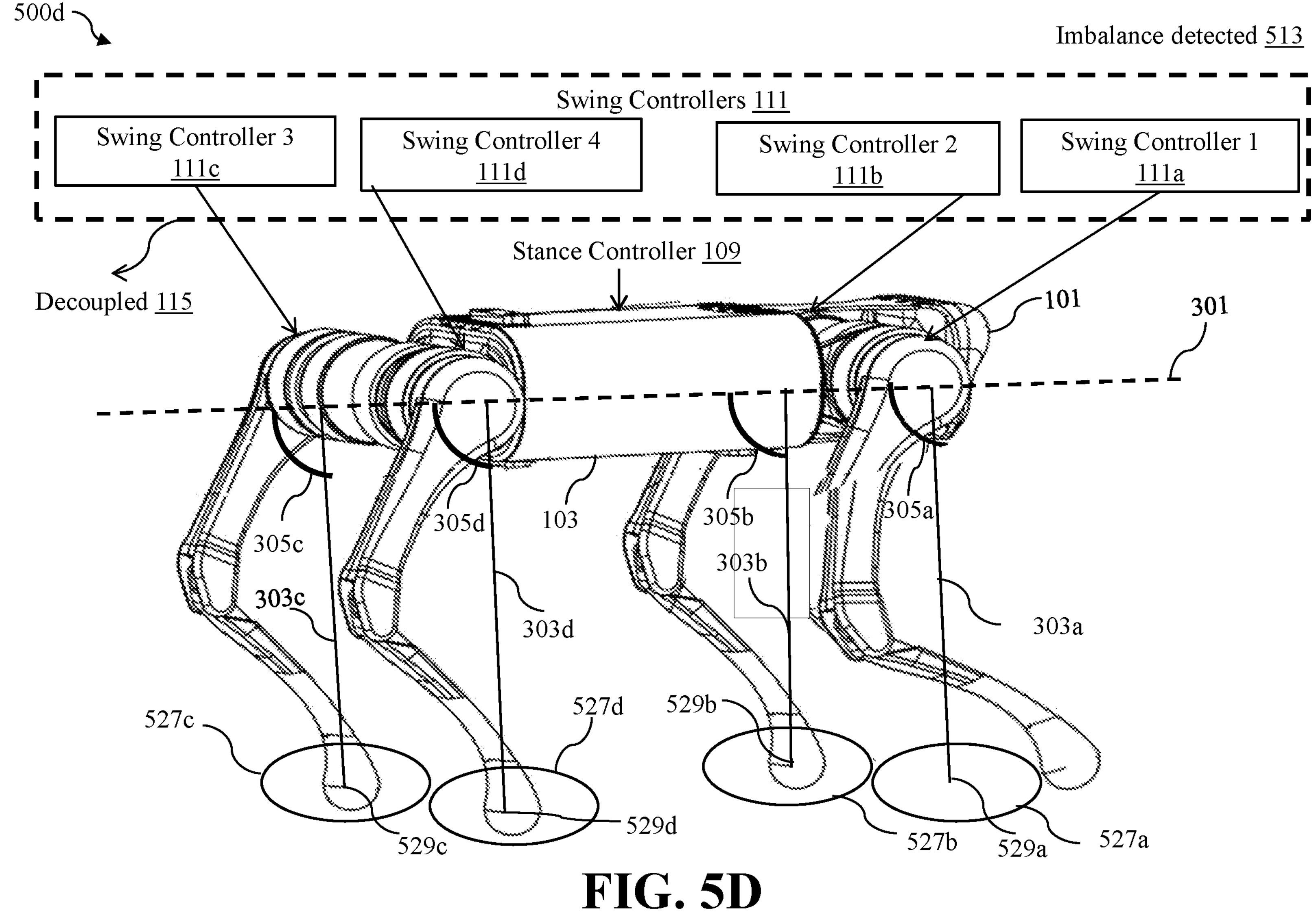
FIG. 5D illustrates a schematic for detecting the imbalance based on the projection of the shape, according to some embodiments of the present disclosure.

FIG. 5D illustrates a schematic 500*d* for detecting the imbalance based on the imbalance function 505, according to some embodiments of the present disclosure. The schematic 500*d* illustrates that the foot position 303*a* associated with the leg 105*a* is outside of the shape 527*a* centered on the projection of the hip position 529*a* to the ground, the foot position 303*b* associated with the leg 105*b* is inside of a shape 527*b* centered on a projection of a hip position 529*b* to the ground, the foot position 303*c* associated with the leg 105*c* is inside of a shape 527*c* centered on a projection of a hip position 529*c* to the ground, and the foot position 303*d* associated with the leg 105*d* is inside of a shape 527*d* centered on a projection of a hip position 529*d* to the ground. Further, based on a determination that each foot position of the multi-legged robot 101 is not inside of the respective shape centered on the respective projection of the respective hip position to the ground, the imbalance function 505 indicates the detected imbalance 513.

In some embodiments, the multi-legged robot 101 may employ a trot gait to perform the task. Accordingly, a flowchart is described with reference to FIG. 6A.

Figure 6A:
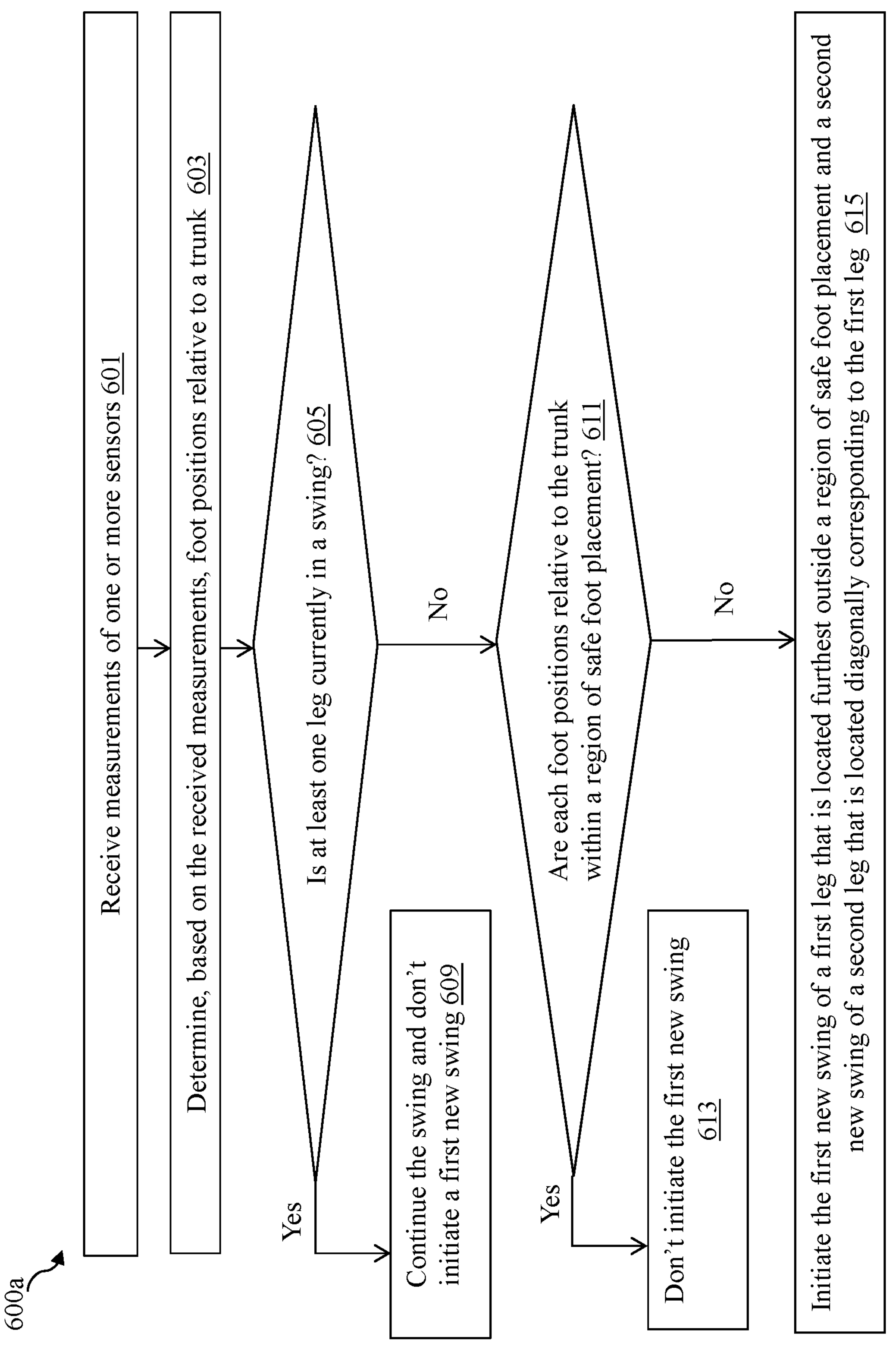
FIG. 6A illustrates a flowchart for executing a trot gait, according to some embodiments of the present disclosure.

FIG. 6A illustrates a flowchart of a method 600*a* for implementing a trot gait, according to some embodiments of the present disclosure. In one or more embodiments, the control system 201 may perform one or more portions of the method 600*a* and may be implemented in, for instance, the processor 203. As such, the control system 201 may provide means for accomplishing embodiments of other process described herein in conjunction with other components of the system 201. Although the method 600*a* is illustrated as a sequence of steps, its contemplated that various embodiments of the method 600*a* may be performed in any order or combination and need not include all of the illustrated steps.

At block 601, the measurements of the one or more sensors are received. In some embodiments, the measurements of the one or more sensors are received as the feedback signal 215. Additionally, the measurements of the one or more sensors are received corresponding to current state of the multi-legged robot 101.

At block 603, based on the received measurements, each foot position relative to the trunk 103 of the multi-legged robot 101 is determined. In some embodiments, based on the received measurements, a state estimation function may determine each foot position relative to the trunk 103. Further, the state estimation function may correspond to a forward kinematic function. The forward kinematic function may determine each foot position relative to the trunk 103 based on the received measurements, such as the joint angle measurements, joint velocity measurements, or joint torques.

At block 605, based on each foot position relative to the trunk 103, a determination is made whether at least one leg is currently in a swing or not.

At block 609, if the at least one leg is in swing, the swing of the at least one leg is continued and a first new swing is not initiated.

However, if the at least one leg is not in swing, then, at block 611, a determination is made whether each foot position relative to the trunk 103 of the multi-legged robot 101 is within a region of safe foot placement or not. If each foot position relative to the trunk 103 of the multi-legged robot 101 is within the region of safe foot placement, then at block 613, the first new swing is not initiated.

However, if each foot position relative to the trunk 103 of the multi-legged robot 101 is not within the region of safe foot placement, then at block 615, the first new swing corresponding to a first leg that is located furthest outside the region of safe foot placement and a second new swing corresponding to a second leg that is located diagonally relative to the first leg is initiated.

Accordingly, various embodiments for implementing the trot gait is described with reference to FIG. 6B and FIG. 6C.

Figure 6B:
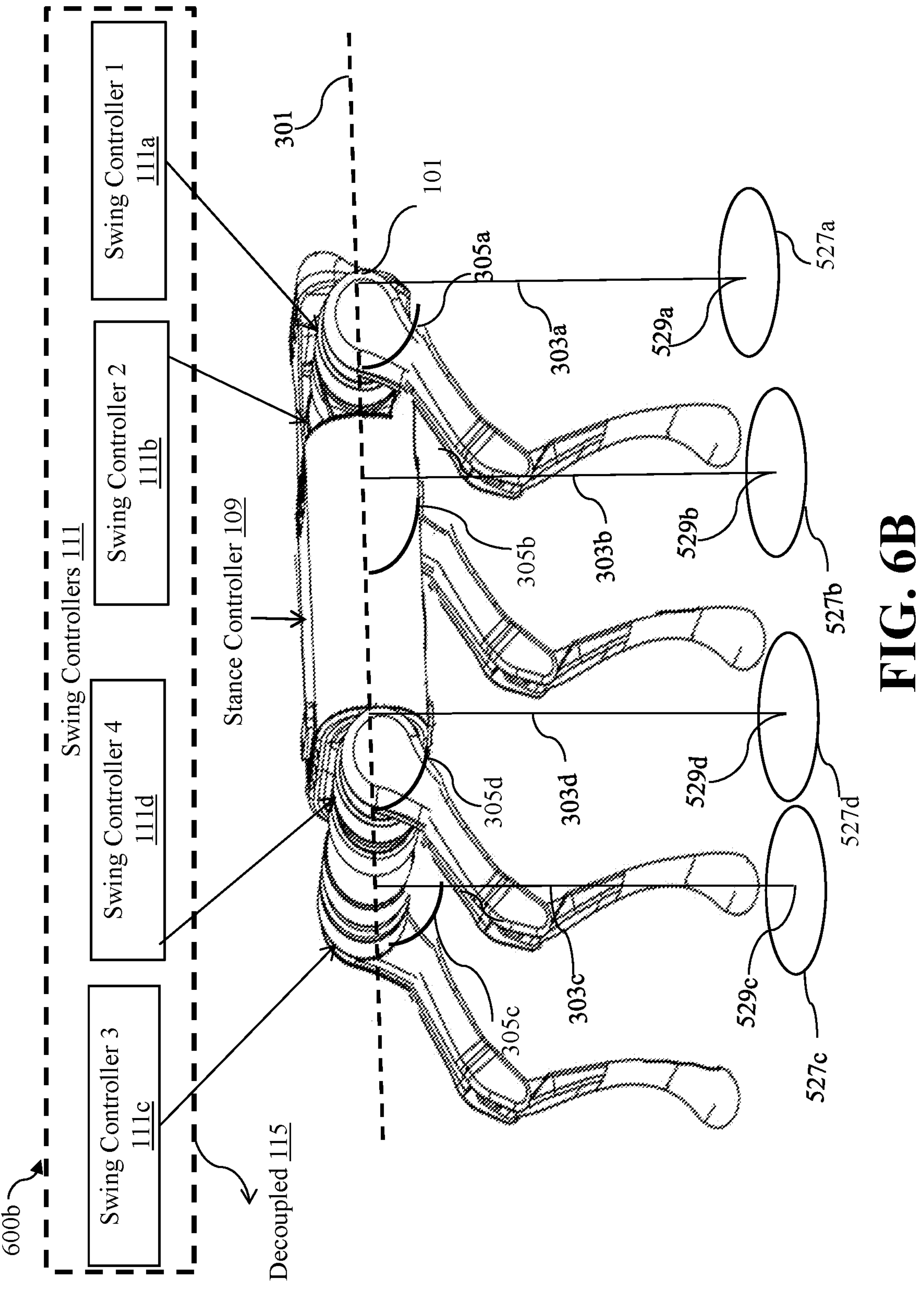
FIG. 6B illustrates a schematic for executing the trot gait, according to some embodiments of the present disclosure.

FIG. 6B illustrates a schematic 600*b* for implementing the trot gait, according to some embodiments of the present disclosure. The schematic 600*b* illustrates that each of foot positions relative to the trunk 103 are not within the region of safe foot placement that is indicative of the detected imbalance 513. Specifically, the foot position 303*a* associated with the leg 105*a* relative to the trunk 103 is not within the region of safe foot placement 527*a*. The foot position 303*b* associated with the leg 105*b* relative to the trunk 103 is not within the region of safe foot placement 527*b*. The foot position 303*c* associated with the leg 105*c* relative to the trunk 103 is not within the region of safe foot placement 527*c*. A foot position 303*d* associated with the leg 105*d* relative to the trunk 103 is not within the region of safe foot placement 527*d* is not within the region of safe foot placement 527*d*.

Further, in some embodiments, based on the detection of the imbalance 513, the processor 203 is configured to correct the imbalance by implementing the trot gait.

Figure 6C:
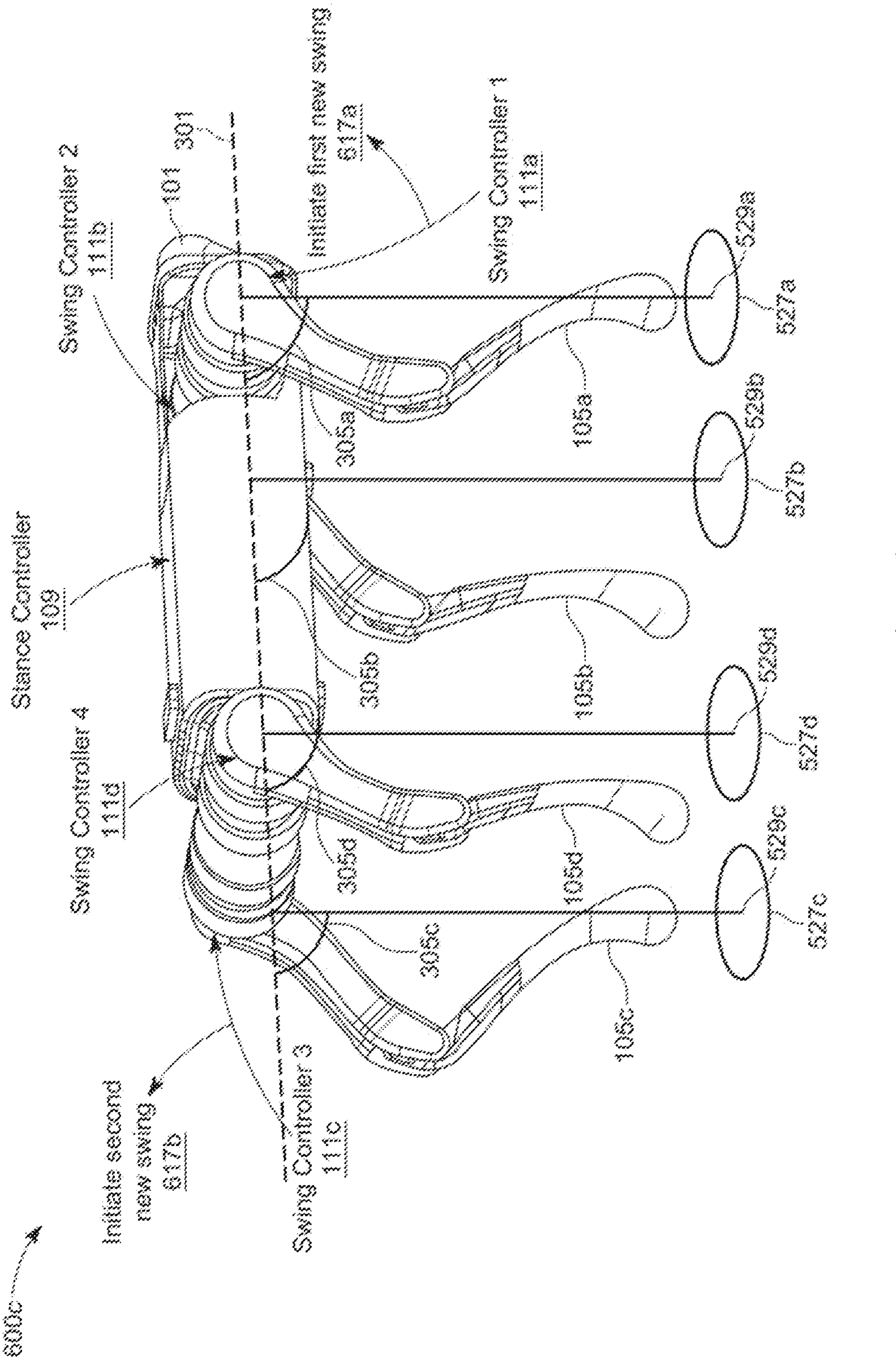
FIG. 6C illustrates a schematic for executing the trot gait, according to some embodiments of the present disclosure.

FIG. 6C illustrates a schematic 600*c* for executing the trot gait, according to some embodiments of the present disclosure. Based on the determination that each foot position relative to the trunk 103 are not within the respective region of safe foot placement, the processor 203 is configured to execute the swing controller 1, 111*a*, to initiate a first new swing 617*a* of the leg 105*a* that is located furthest outside the region of safe foot placement 527*a* and to execute the swing controller 3 111*c* to initiate a second new swing 617*b* of the leg 105*c* that is located diagonally corresponding to the first leg 105*a*, simultaneously.

In some embodiments, the multi-legged robot 101 may employ a walk gait to perform the task. Accordingly, a flowchart is described with reference to FIG. 7A.

Figure 7A:
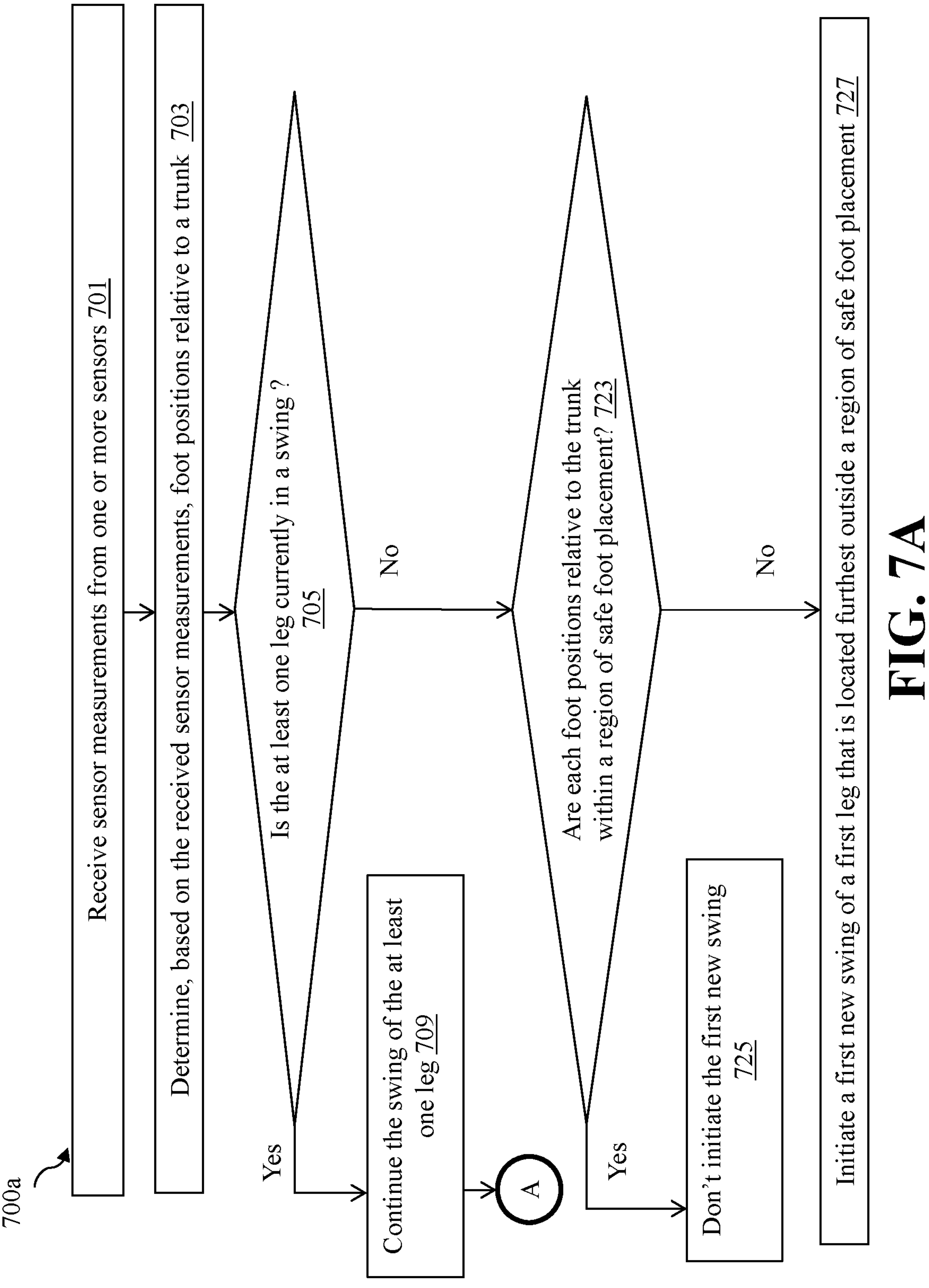
FIG. 7A illustrates a flowchart for implementing a walk gait, according to some embodiments of the present disclosure.
Figure 7A:
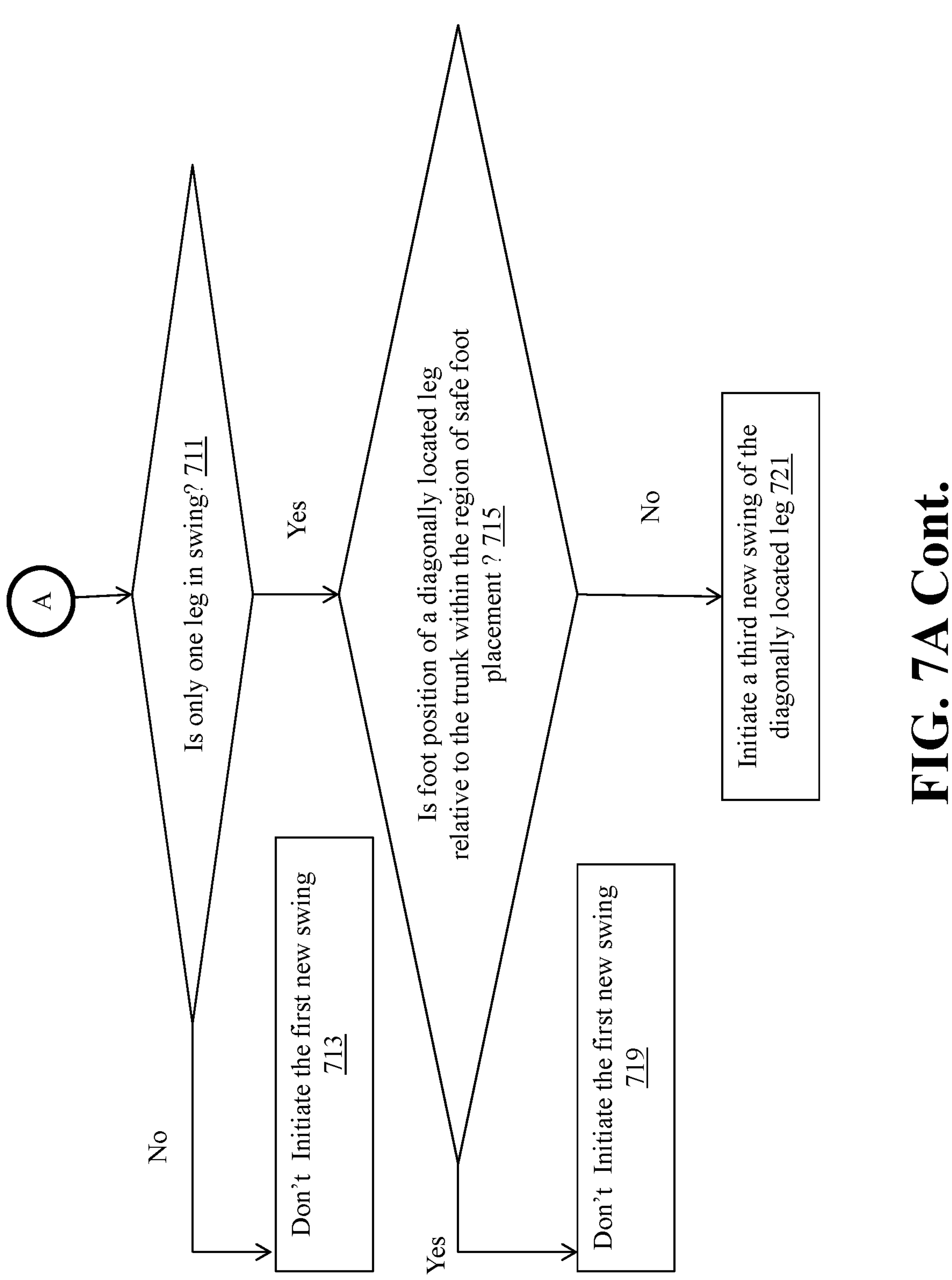

FIG. 7A illustrates a flowchart of a method 700*a* for implementing a walk gait, according to some embodiments of the present disclosure. As such, the control system 201 may provide means for accomplishing embodiments of other process described herein in conjunction with other components of the system 201. Although the method 700*a* is illustrated as a sequence of steps, its contemplated that various embodiments of the method 700*a* may be performed in any order or combination and need not include all of the illustrated steps.

At block 701, the measurements of the one or more sensors are received. In some embodiments, the measurements of the one or more sensors are received as the feedback signal 215. Additionally, the measurements of the one or more sensors are received corresponding to current state of the multi-legged robot 101.

At block 703, based on the received measurements, each foot positions relative to the trunk 103 of the multi-legged robot 101 is determined. In some embodiments, based on the received measurements, a state estimation function may determine each foot position relative to the trunk 103. Further, the state estimation function may correspond to a forward kinematic function. The forward kinematic function may determine the each foot position relative to the trunk 103 based on the received measurements, such as the joint angle measurements, joint velocity measurements, or joint torques.

At block 705, based on the received measurements, a determination is made whether the at least one leg in the swing or not.

If the at least one leg is in the swing, then at block 709, the swing of the at least one leg is continued. Further, at block 711, a determination is made whether only one leg of the plurality of legs of the multi-legged robot 101 in the swing or not.

If the only one leg of the plurality of legs is not in the swing, then, at block 713, the first new swing corresponding to the first leg of the multi-legged robot 101 is not initiated.

However, if the only one leg of the plurality of legs is in swing, then, at block 715, a determination is made whether a foot position of a diagonally located leg relative to the trunk 103, corresponding to the only one leg of the plurality of legs within the region of safe foot placement or not.

If the foot position of the diagonally located leg relative to the trunk 103 is within the region of safe foot placement, then, at block 719, the first new swing corresponding to the first leg of the multi-legged robot 101 is not initiated.

If the foot position of the diagonally located leg relative to the trunk 103 is not within the region of safe foot placement, then, at block 721, a third new swing of the diagonally located leg is initiated.

Referring back to block 705, if the at least one leg is not currently in the swing, then, at block 723, a determination is made whether each foot position relative to the trunk 103 within the region of safe foot placement or not.

If each foot position relative to the trunk 103 is within the region of safe foot placement, then, at block 725, the first new swing corresponding to the first leg of the multi-legged robot 101 is not initiated.

However, if each foot position relative to the trunk 103 is not within the region of safe foot placement, then, at block 727, first new swing corresponding to the first leg of the multi-legged robot 101 is initiated that is located furthest outside the region of safe foot placement.

According, an example embodiment for implementing the walk gait is described with reference to FIG. 7B.

Figure 7B:
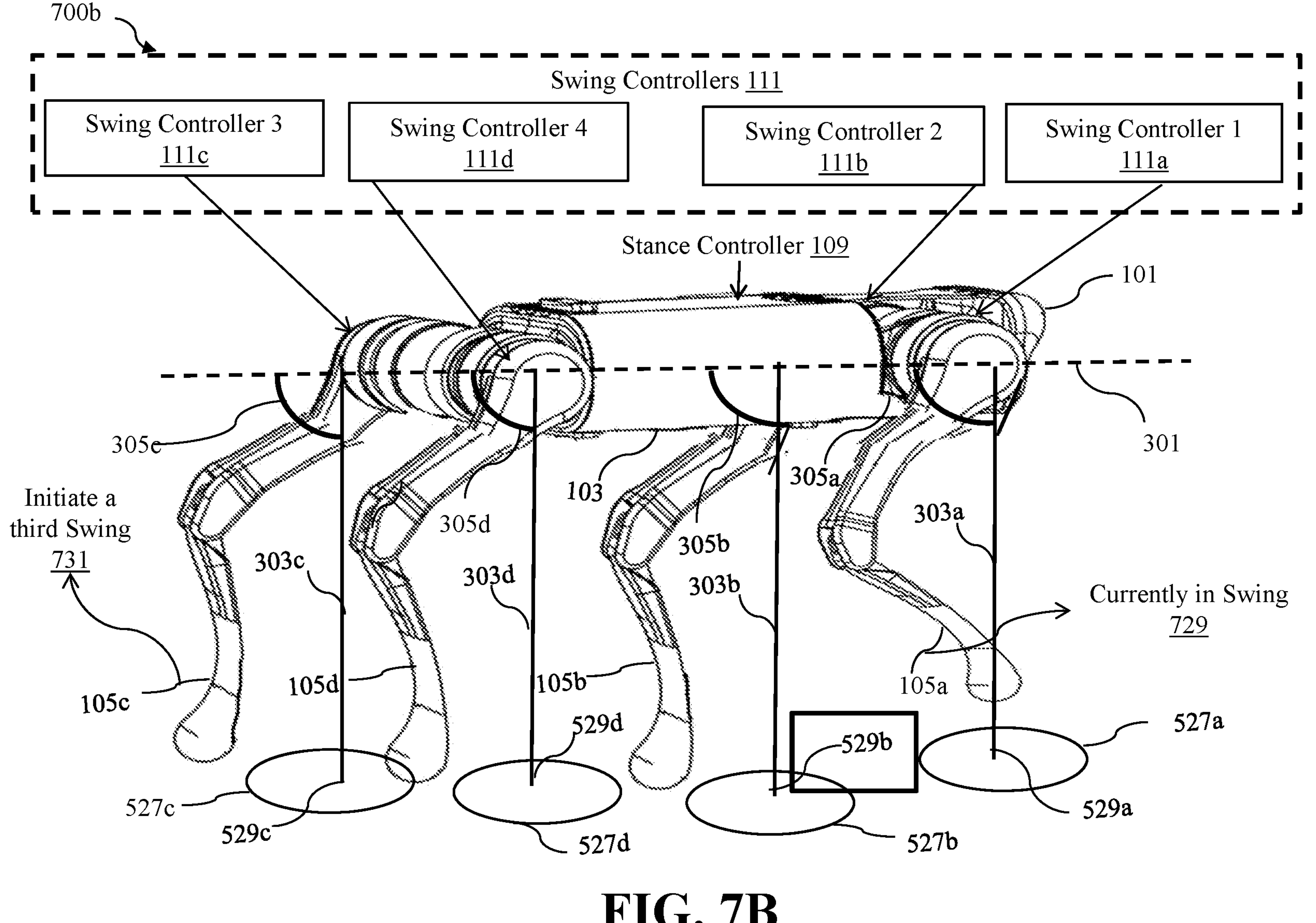
FIG. 7B illustrates a schematic for implementing the walk gait, according to some embodiments of the present disclosure.

FIG. 7B illustrates a schematic 700*b* for implementing a walk gait, according to some embodiments of the present disclosure. The schematic 700*b* illustrates based on the determination of that only one leg, for example, the leg 105*a*, is currently in swing 729 and the foot position 303*c* of the diagonally located leg, for example the leg 105*c* relative to the trunk 103 outside the region of safe foot placement 527*c*, the processor 203 is further configured to execute the swing controller 3, 111*c*, to initiate the third swing, for example, a third swing 731.

Accordingly, an algorithm is described with reference to FIG. 8 to control the multi-legged robot 101.

Figure 8:
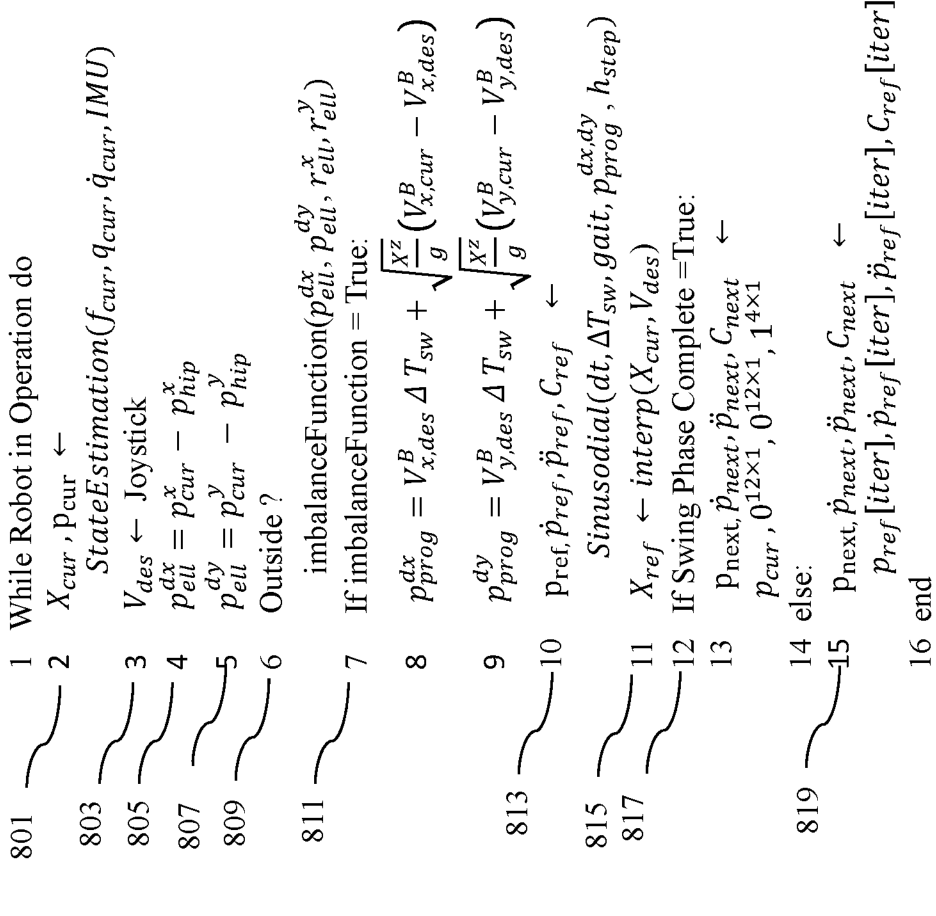
FIG. 8 illustrates a footstep planner algorithm, according to some embodiments of the present disclosure.

FIG. 8 illustrates a footstep planner algorithm 800, according to some embodiments of the present disclosure. For iteration, at step 801, based on a state estimation function, a robot current state $X_{cur}$ and a current footstep position $p_{cur}$ are estimated by $$StateEstimation(f_{cur}, q_{cur}, \dot{q}_{cur}, IMU), \quad (1)$$

where $f_{cur}$ are ground reaction forces, $q_{cur}$ are current joint angles, $\dot{q}_{cur}$ are current joint velocities, IMU is Inertial Measurement Unit data.

In some embodiments, the stance controller 109 is further configured to determine the ground reaction forces as $$\tau_{i,t} = J_{i,t}^{\top} R_{b,i,t}^{w,\top}(-f_{i,t}), \quad (1a)$$

where, $f_{I,t)} \in \mathbb{R}^3$ is a force vector associated with leg i as subset of $f_t$, and $$R_{b,i,t}^{w,T}$$

is a rotation matrix from a world to a body frame of leg i at time step t.

Further, in some embodiments, each swing controller of the plurality of swing controllers is configured to compute the ground reaction forces for each foot I for all three joints of the multi-legged robot 101. The ground reaction forces may be as given below:

$$\tau_i = J_i^{\top}[K_p(p_{i,ref} - p_i) + K_d(v_{i,ref}) - v_i)] + J_i^{\top}\Lambda_i a_{i,ref} + V_i(\dot{q}_i) + G_i(qi), \quad (1b)$$

where $\tau_i \in \mathbb{R}^3$ is a joint torque, $q_i \in \mathbb{R}^3$ and $\dot{q}_i \in \mathbb{R}^3$ are the current joint position and velocity of foot i, $J_i \in \mathbb{R}^{3\times3}$ is a foot Jacobian, $K_p$ and $K_d$ Kd are the proportional and derivative (PD) gain matrices (3×3 diagonal positive semidefinite), $p_{i,ref} \in \mathbb{R}^3$ and $p_i \in \mathbb{R}^3$ are the reference and current footstep positions in the body frame, $v_{I,ref} \in \mathbb{R}^5$ and $v_i \in \mathbb{R}^3$ are the reference and current footstep velocities in the body frame, $a_{i,ref} \in \mathbb{R}^3$ is a reference footstep acceleration in the body frame, $V_i \in \mathbb{R}^3$ is a torque due to a Coriolis and centrifugal forces, $G_i \in \mathbb{R}^5$ is a torque due to a gravity, and $\Lambda_i \in \mathbb{R}^{3\times3}$ is an operational mass matrix.

At step 803, a desired robot body velocity, $V_{des}(2)$ is received. In some embodiments, the desired velocity may be received from a robot operator. Further, in some embodiments, the desired velocity may be received from a higher level planning module.

At step 805, based on a difference between a current footstep position, $$p_{cur}^x$$

in x-axis and a robot hip position $$p_{hip}^x$$

in x-axis, a loot distance from hip $$p_{ell}^{dx}$$

is determined $$p_{ell}^{dx} = p_{cur}^x - p_{hip}^x. \quad (3)$$

In some embodiments, for each leg of the multi-legged robot 101, the current footstep position, $$p_{cur}^{x}$$

and the current footstep position $$p_{cur}^{y},$$

are determined, based on forward kinematics and the measurements of one or more sensors.

At step 807, based on a difference between a current footstep position, $$p_{cur}^{y}$$

in y-axis and a robot hip position $$p_{hip}^{y}$$

in y-axis, a foot distance from hip $$p_{ell}^{dy}$$

is determined $$p_{ell}^{dy} = p_{cur}^{y} - p_{hip}^{y}. \tag{4}$$

At step 809, for each foot of the multi-legged robot 101 that are in a contact with the ground, based on the imbalance function is executed to determine whether the at least one foot position is outside the shape or not. The imbalance function may be given as $$imbalanceFunction\left(p_{ell}^{dx}, p_{ell}^{dy}, r_{ell}^{x}, r_{ell}^{y}\right). \tag{5a}$$

Further, the imbalance function may determine the position of the at least one foot based on an inequality condition. The inequality condition may be given as $$\frac{\left(p_{ell}^{dx}\right)^2}{\left(r_{ell}^{x}\right)^2} + \frac{\left(p_{ell}^{dy}\right)^2}{\left(r_{ell}^{y}\right)^2} > 1. \tag{5b}$$

At step 811, based on the determination if the at least one leg is outside the shape, a next footstep swing trajectory and corresponding trunk trajectory, an additional term corresponding to the desired velocity in x-axis of the multi-legged robot 101 is determined as, $$p_{prog}^{dx} = V_{x,des}^{B} \Delta T_{sw} + \sqrt{\frac{X^z}{g}}\left(V_{x,cur}^{B} - V_{x,des}^{B}\right), \tag{6a}$$

where $X^z$ is a height of the multi-legged robot, g is a gravity term, $\Delta T_{sw}$ is a footstep timing for the swing phase, and B is a body frame.

Further, an additional term corresponding to the desired velocity in y-axis of the multi-legged robot 101 is determined as, $$p_{prog}^{dy} = V_{y,des}^{B} \Delta T_{sw} + \sqrt{\frac{X^z}{g}}\left(V_{y,cur}^{B} - V_{y,des}^{B}\right). \tag{6b}$$

Further, an output including a reference footstep position $p_{ref}$, a reference footstep velocity $\dot{p}_{ref}$, and a reference acceleration $\ddot{p}_{ref}$ is generated.

At step 813, a footstep reference trajectory is determined based on the current footstep position $p_{curr}$, a center of the shape, and the additional term corresponding to the desired velocity in x-axis of the multi-legged robot $$p_{prog}^{dx}$$

and the additional term corresponding to the desired velocity in y-axis of the multi-legged robot $$p_{prog}^{dy}.$$

Further, the reference footstep trajectory from the current footstep position $p_{curr}$ to a next foot position, $p_{next}$ is generated using a sinusoidal implementation given as, $$\overline{a}_z = p_{step}\frac{1}{2}\left(\frac{2\pi}{\Delta T_{sw}}\right)^2 \tag{7a}$$

$$a_{z,t} = \overline{a}_z \cos\left(\frac{2\pi}{\Delta T_{sw}}t\right) \tag{7b}$$

$$v_{z,t} = \overline{a}_z \frac{\Delta T_{sw}}{2\pi}\sin\left(\frac{2\pi}{\Delta T_{sw}}t\right) \tag{7c}$$

$$p_{z,t} = \overline{a}_z\left(\frac{\Delta T_{sw}}{2\pi}\right)^2\left(1 - \cos\left(\frac{2\pi}{\Delta T_{sw}}t\right)\right), \tag{7d}$$

where $p_{step}$ is a step height, and $\overline{a}_z$ is a maximum vertical acceleration.

Further, a maximum acceleration $\overline{a}_z$ and a maximum acceleration $\overline{a}_y$ may be given as $$\overline{a}_x = \left(p_{ell}^{dx} + p_{prog}^{dx}\right)\frac{1}{2}\left(\frac{\pi}{\Delta T_{sw}}\right)^2 \tag{8a}$$

$$\overline{a}_y = \left(p_{ell}^{dy} + p_{prog}^{dy}\right)\frac{1}{2}\left(\frac{\pi}{\Delta T_{sw}}\right)^2 \tag{8b}$$

$$a_{x,t} = \overline{a}_x \cos\left(\frac{\pi}{\Delta T_{sw}}t\right) \tag{8c}$$

$$a_{y,t} = \overline{a}_y \cos\left(\frac{\pi}{\Delta T_{sw}}t\right) \tag{8d}$$

$$v_{x,t} = \overline{a}_x \frac{\Delta T_{sw}}{\pi}\sin\left(\frac{\pi}{\Delta T_{sw}}t\right) \tag{8e}$$

$$v_{y,t} = \overline{a}_y \frac{\Delta T_{sw}}{\pi}\sin\left(\frac{\pi}{\Delta T_{sw}}t\right) \tag{8f}$$

-continued $$p_{x,t} = \overline{a}_x\left(\frac{\Delta T_{sw}}{\pi}\right)^2\left(1 - \cos\left(\frac{\pi}{\Delta T_{sw}}t\right)\right) \tag{8g}$$

$$p_{y,t} = \overline{a}_y\left(\frac{\Delta T_{sw}}{\pi}\right)^2\left(1 - \cos\left(\frac{\pi}{\Delta T_{sw}}t\right)\right). \tag{8h}$$

In some embodiments, the sinusoidal implementation may be modified based on the one or more tasks, for example a climbing task, a traversing task, and the like. Further, in some embodiments, the sinusoidal implementation may be modified to alter one or more touchdown point of the multi-legged robot 101.

Further, at step 815, a reference body state is determined based on the robot's current state $X_{cur}$ and the desired robot body velocity, $V_{des}$.

Further, at step 817, based on the determination that the swing of at least one leg, each leg of the multi-legged robot is completed, the processor 203 is further configured to put each leg of the plurality of legs in stance. In some embodiment, the processor 203 is further configured to put each leg of the plurality of legs in stance by changing a value of a current footstep velocity $\dot{p}_{cur}$ to $0^{12\times1}$ In some embodiment, the processor 203 is further configured to put each leg of the plurality of legs in stance by changing a value of a current footstep acceleration $\ddot{p}_{cur}$ to $0^{12x1}$ Further, the processor 203 is further configured to change a value of a current foot contact matrix $C_{cur}$ to $1^{4\times1}$. Further, the processor 203 is further configured to determine a next footstep position $p_{next}$, a next footstep velocity $\dot{p}_{next}$, a next footstep position acceleration $\ddot{p}_{next}$, and a next foot contact matrix $C_{next}$ to swing a next leg of the multi-legged robot 101. The step 817 may be formulated as $$p_{next}, \dot{p}_{next}, \ddot{p}_{next}, C_{next} \leftarrow p_{cur}, 0^{12\times1}, 0^{12\times1}, 1^{4\times1} \tag{9a}$$

However, if the swing of the at least one leg is not completed, then, at step 819, the processor 203 is configured to continue the swing of the at least one leg by iterating through the reference trajectory 113. The processor 203 is further configured to iterate through the reference trajectory 113 by iterating the reference footstep position $p_{ref}$, the reference footstep velocity $\dot{p}_{ref}$, the reference footstep acceleration $\ddot{p}_{ref}$, the foot contact matrix $C_{ref}$. Further, after the iteration through the reference trajectory, the processor 203 is further configured to swing the next leg of the multi-legged robot 101 based on the next footstep position $p_{next}$, the next footstep velocity $\dot{p}_{next}$, the next footstep position acceleration $\ddot{p}_{next}$, and the next foot contact matrix $C_{next}$ The step 819 may be formulated as below $$p_{next}, \dot{p}_{next}, \ddot{p}_{next}, C_{next} \leftarrow p_{ref}[iter], \dot{p}_{ref}[iter], \ddot{p}_{ref}[iter], C_{ref}[iter] \tag{10a}$$

where iter indicates the current iteration. In some embodiment, the multi-legged robot 101 may correspond to a six-legged robot. Accordingly, an example embodiment to correct the detected imbalance of the six-legged robot is described with reference to FIG. 9.

Figure 9A:
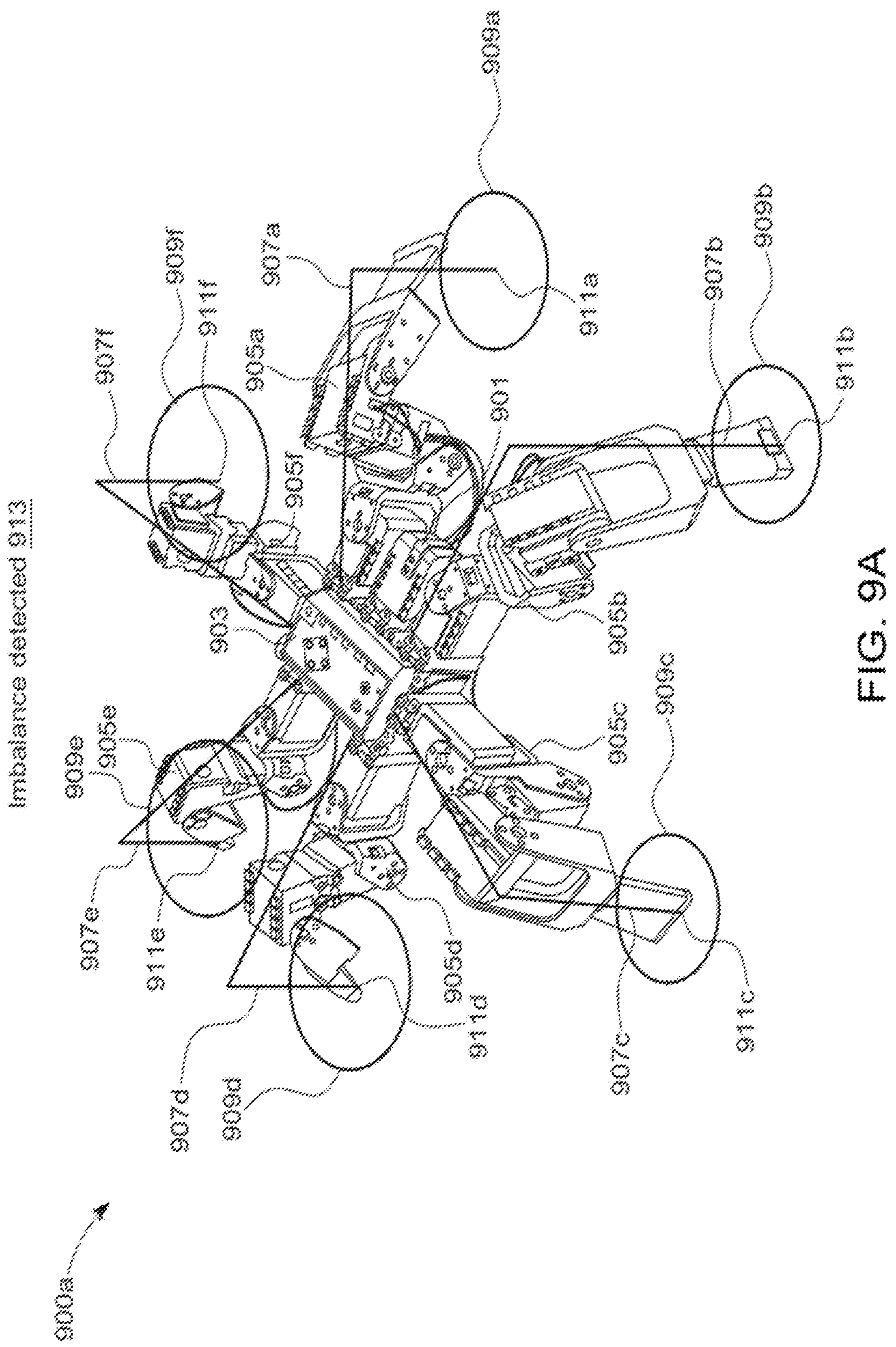
FIG. 9A illustrates a schematic for detecting the imbalance of a six-legged robot, according to some embodiments of the present disclosure.

FIG. 9A illustrates a schematic 900*a* for detecting the imbalance of a six-legged robot 901, according to some embodiments of the present disclosure. The six-legged robot 901 comprises a trunk 903, and six legs, for example, a leg 905*a*, a leg 905*b*, a leg 905*c*, a leg 905*d*, a leg 905*e*, and a leg 905*f*.

The schematic 900*a* illustrates a foot position 907*a* associated with the leg 905*a* is outside of a shape 909*a* that is centered on a projection of a hip position 911*a*, a foot position 907*b* associated with the leg 905*b* that is in a shape 909*b* centered on a projection of a hip position 911*b,a* foot position 907*c* associated with the leg 905*c* that is in a shape 909*c* centered on a projection of a hip position 911*c,a* foot position 907*d* associated with the leg 905*d* that is in a shape 909*d* centered on a projection of a hip position 911*d,a* foot position 907*e* associated with the leg 905*e* that is in a shape 909*e* centered on a projection of a hip position 911*e*, and a foot position 907*a* associated with the leg 905*a* is outside of a shape 909*a* that is centered on a projection of a hip position 911*a*. Further, based on a determination that the foot position associated with the leg 905*a* is outside of the shape 909*a* that is centered on the projection of the hip position 911*a*, the imbalance function 505 detects the imbalance 913.

Figure 9B:
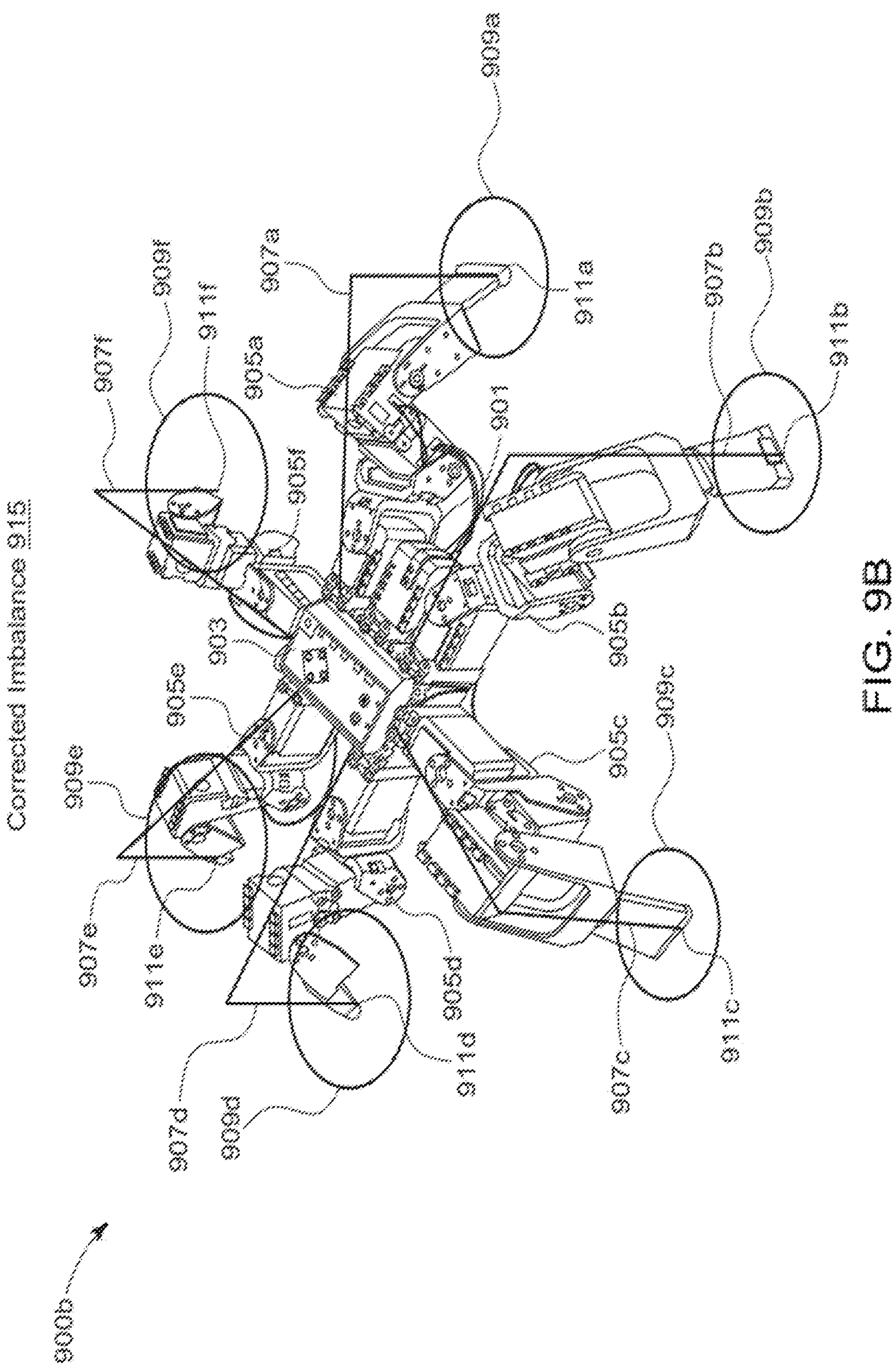
FIG. 9B illustrate a schematic for correcting the imbalance of the six-legged robot, according to some embodiments of the present disclosure.

FIG. 9B illustrates a schematic 900*b* for correcting the imbalance of the six-legged robot 901, according to some embodiments of the present disclosure. The schematic 900*b* illustrates based on the detection of the imbalance 911 the processor 203 is configured to execute the swing action to correct the imbalance 913 by moving a foot of the leg 905*a* in a center of the shape 909. Additionally or alternatively, the processor 203 is further configured to correct the imbalance 915 by moving the foot of the leg 905*a* in an anticipated center of the shape 909*a* based on a velocity, for example, a desired robot body velocity of the six-legged robot 901.

In some embodiments, the multi-legged robot 101 may correspond to a two-legged robot. Accordingly, an example embodiment to correct the detected imbalance of the two-legged robot is described with reference to FIG. 10.

Figure 10A:
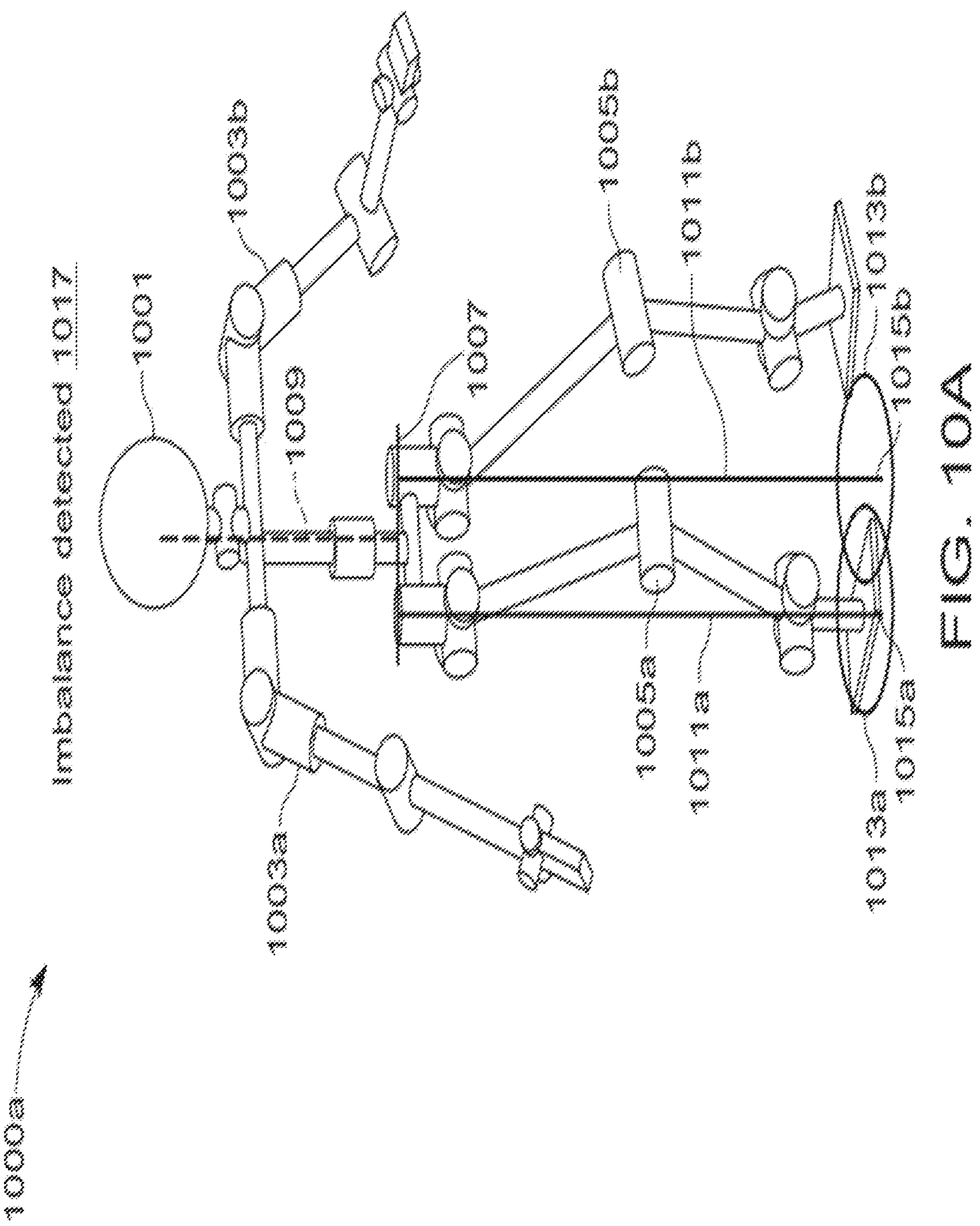
FIG. 10A illustrates a schematic for detecting the imbalance of a two-legged robot, according to some embodiments of the present disclosure.

FIG. 10A illustrates a schematic 1000*a* for detecting the imbalance of a two-legged robot 1001, according to some embodiments of the present disclosure. The two-legged robot comprises two arms, for example, an arm 1003*a*, and an arm 1003*b*, two legs, for example, a leg 1005*a*, and a leg 1005*b*, a trunk 1007, and a center of mass 1009. The schematic 1000 illustrates a foot position 1011*a* associated with the leg 1005*a* is inside a shape 1013*a* centered on a projection of a hip position 1015*a* and a foot position 1011*b* associated with the leg 1005*a* is outside a shape 1013*b* centered on a projection of a hip position 1015*b*. Further, based on a determination that the foot position 1011*b* associated with the leg 1005*a* is outside the shape 1013*b* centered on the projection of the hip position 1015*b*, the imbalance function 505 detects the imbalance 1017.

Figure 10B:
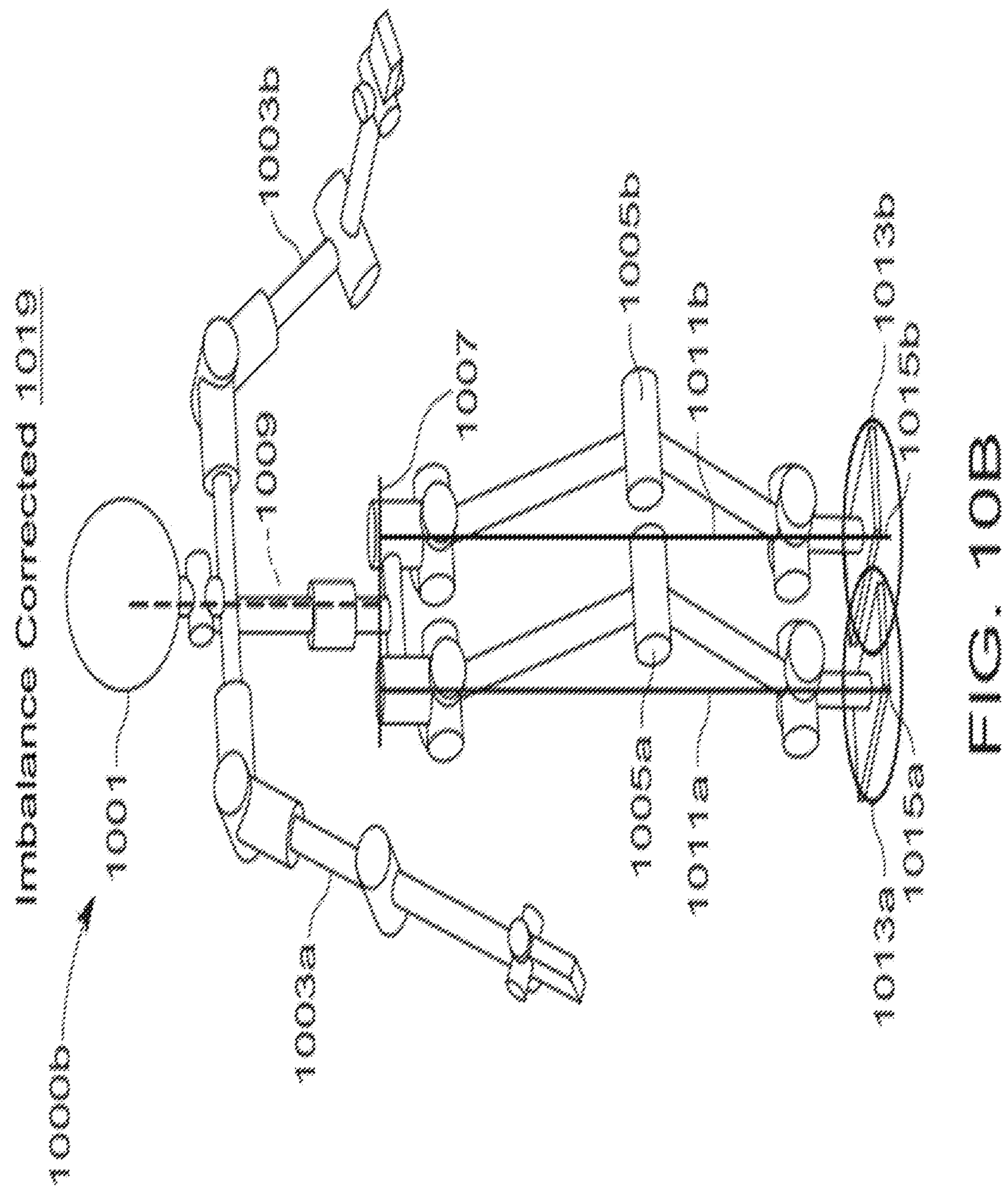
FIG. 10B illustrates a schematic for correcting the imbalance of the two-legged, according to some embodiments of the present disclosure.

FIG. 10B illustrates a schematic 1000*b* for correcting the imbalance of the two-legged robot 1001, according to some embodiments of the present disclosure. The schematic 1000*b* illustrates that based on the detection of the imbalance 1017, the processor 203 is further configured to execute the swing action to correct the detected imbalance 1019 by moving a foot of the leg 1005*b* in a center of the shape 1013*b*. Additionally or alternatively, the processor 203 is further configured to correct the detected imbalance 1019 by moving the foot of the leg 1005*b* in an anticipated center of the shape 1013*b* based on a velocity, for example, a desired robot body velocity of the two-legged robot 1001.

Accordingly, a computing device 1100 for controlling the multi-legged robot 101 corresponding to various embodiments of the present disclosure is described with reference to FIG. 11.

Figure 11:
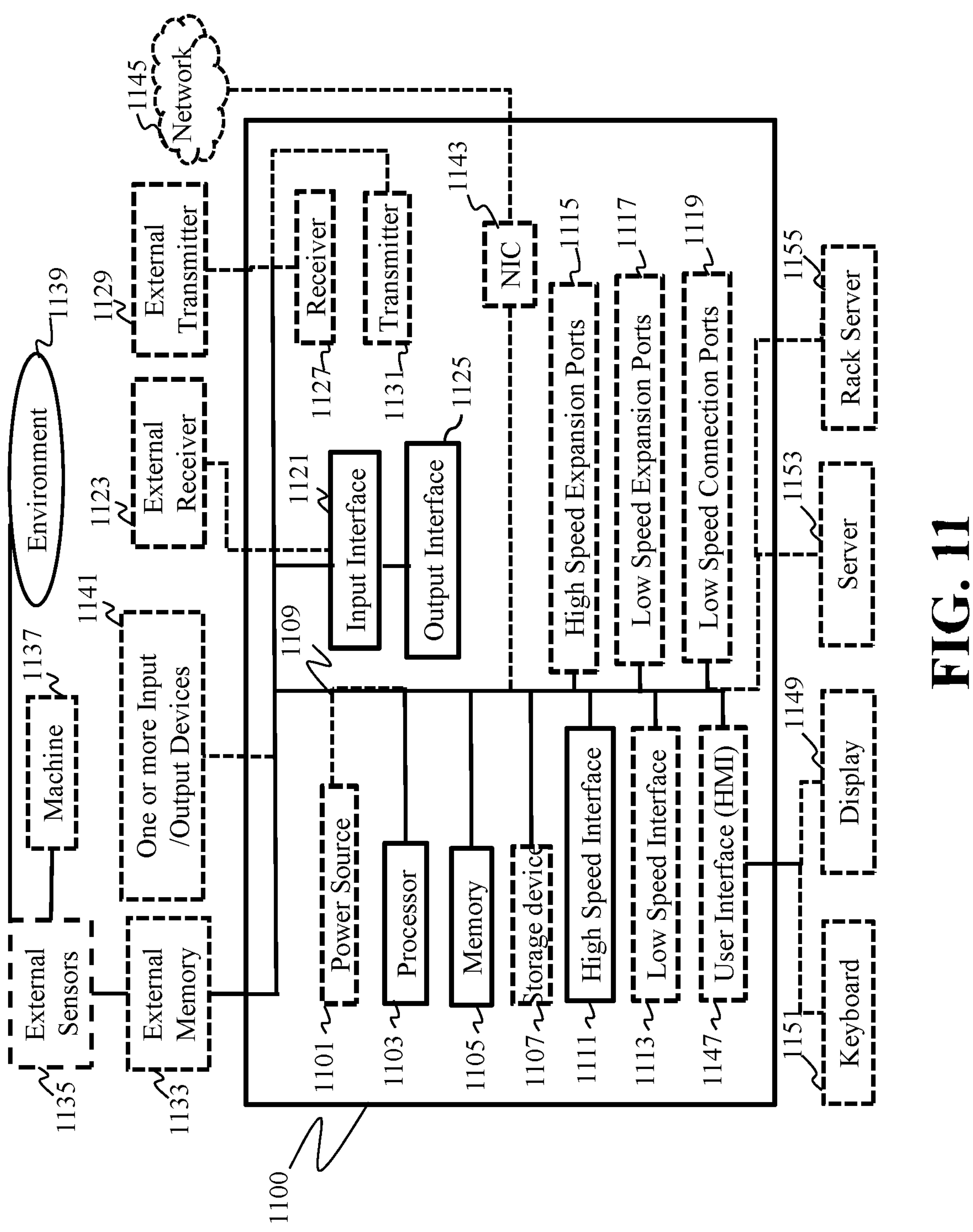
FIG. 11 illustrates a schematic diagram illustrating a commuting device that can be used for implementing the control system of the present disclosure.

FIG. 11 is a schematic illustrating a computing device 1100 for implementing the control system 201 and methods of the present disclosure. The computing device 1100 includes a power source 1101, a processor 1103, a memory

1105, a storage device 1107, all connected to a bus 1109. Further, a high-speed interface 1111, a low-speed interface 1113, high-speed expansion ports 1115 and low speed connection ports 1117, can be connected to the bus 1109. In addition, a low-speed expansion port 1119 is in connection with the bus 1109. Further, an input interface 1121 can be connected via the bus 1109 to an external receiver 1123 and an output interface 1125. A receiver 1127 can be connected to an external transmitter 1129 and a transmitter 1131 via the bus 1109. Also connected to the bus 1109 can be an external memory 1133, external sensors 1135, machine(s) 1137, and an environment 1139. Further, one or more external input/output devices 1141 can be connected to the bus 1109. A network interface controller (NIC) 1143 can be adapted to connect through the bus 1109 to a network 1145, wherein data or other data, among other things, can be rendered on a third-party display device, third party imaging device, and/or third-party printing device outside of the computer device 1100.

The memory 1105 can store instructions that are executable by the computer device 1100 and any data that can be utilized by the methods and systems of the present disclosure. The memory 1105 can include random access memory (RAM), read only memory (ROM), flash memory, or any other suitable memory systems. The memory 1105 can be a volatile memory unit or units, and/or a non-volatile memory unit or units. The memory 1105 may also be another form of computer-readable medium, such as a magnetic or optical disk.

The storage device 1107 can be adapted to store supplementary data and/or software modules used by the computer device 1100. The storage device 1107 can include a hard drive, an optical drive, a thumb-drive, an array of drives, or any combinations thereof. Further, the storage device 1107 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 1103), perform one or more methods, such as those described above.

The computing device 1100 can be linked through the bus 1109, optionally, to a display interface or user Interface (HMI) 1147 adapted to connect the computing device 1100 to a display device 1149 and a keyboard 1151, wherein the display device 1149 can include a computer monitor, camera, television, projector, or mobile device, among others. In some implementations, the computer device 1100 may include a printer interface to connect to a printing device, wherein the printing device can include a liquid inkjet printer, solid ink printer, large-scale commercial printer, thermal printer, UV printer, or dye-sublimation printer, among others.

The high-speed interface 1111 manages bandwidth-intensive operations for the computing device 1100, while the low-speed interface 1113 manages lower bandwidth-intensive operations. Such an allocation of functions is an example only. In some implementations, the high-speed interface 1111 can be coupled to the memory 1105, the user interface (HMI) 1147, and to the keyboard 1151 and the display 1149 (e.g., through a graphics processor or accelerator), and to the high-speed expansion ports 1115, which may accept various expansion cards via the bus 1109. In an implementation, the low-speed interface 1113 is coupled to the storage device 1107 and the low-speed expansion ports 1117, via the bus 1109. The low-speed expansion ports 1117, which may include various communication ports (e.g., USB, Bluetooth, Ethernet, wireless Ethernet) may be coupled to the one or more input/output devices 1141. The computing device 1100 may be connected to a server 1153 and a rack server 1155. The computing device 1100 may be implemented in several different forms. For example, the computing device 1100 may be implemented as part of the rack server 1155.

Various embodiments of the present disclosure are based on decoupling of the various controllers associated with the multi-legged robot 101 to reduce the energy consumption, thereby reducing the cost of transportation (COT) and the task completion time. Further, various embodiments employ an easy to implement geometric approach to detect the imbalance that reduces a computational cost. The geometric approach includes detecting the imbalance based on the respective foot position of the respective leg that is outside of the respective shape centered on the respective projection of the respective hip position to the ground. Further, based on the detected imbalance, the various embodiments control the multi-legged robot 101 in various implementations, such as the walk gait implementation, and the trot gait implementation.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof.

When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, and any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship with each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A control system for controlling a robot to perform a task, wherein the robot is a legged robot comprising a trunk and a plurality of legs for supporting the trunk above a ground, wherein the control system comprises a processor; and a memory having instructions stored thereon that, when executed by the processor, causes the control system to:

collect a reference trajectory defining a sequence of states of the robot in a time and a space to perform the task;

execute a stance controller configured to compute and apply reaction forces of the plurality of legs of the robot in a contact with the ground to push the trunk of the robot based on the reference trajectory; and execute a swing controller of a plurality of swing controllers to swing a leg of the plurality of legs in response to detecting a relative position between the trunk and a foot of the leg of the robot indicative of an imbalance of a support of the trunk of the robot above the ground, wherein the processor is configured to detect the imbalance based on a foot position of the leg that is outside of a shape centered on a projection of a hip position to the ground, wherein one or more dimensions of the shape are a function of a speed defined by the reference trajectory, and wherein measurements of mutual positions of joints of the leg of the plurality of legs correspond to the speed defined by the reference trajectory.

2. The control system of claim 1, wherein the swing controller is agnostic to a change of the space commanded by the reference trajectory.

3. The control system of claim 1, wherein the processor is further configured to execute the swing controller in response to the execution of the stance controller.

4. The control system of claim 1, wherein the processor is further configured to execute the swing controller in response to another execution of another swing controller of the plurality of swing controllers.

5. The control system of claim 1, wherein the processor is further configured to execute the swing controller in response to the execution of the stance controller and the detection of the imbalance.

6. The control system of claim 1, wherein the processor is further configured to detect the imbalance based on the measurements of mutual positions of the joints of the leg of the plurality of legs.

7. The control system of claim 1, wherein to swing the leg, the processor is further configured to:

execute a pre-determined imbalance function to detect the imbalance of the foot of the leg based on the mutual positions of the joints of the leg;

estimate a swing action of the leg to correct the detected imbalance;

generate, based on the estimated swing action, one or more commands to one or more actuators of the robot; and control, based on the one or more commands, the one or more actuators to execute the swing action.

8. The control system of claim 7, wherein the pre-determined imbalance function detects the imbalance corresponding to the foot position of the leg on the ground that is outside of the shape centered on the projection of the hip position to the ground.

9. The control system of claim 7, wherein the swing controller is agnostic to the reference trajectory, such that the pre-determined imbalance function and the swing action are computed independently of the reference trajectory.

10. The control system of claim 7, wherein an input to the pre-determined imbalance function includes measurements of sensors indicative of the mutual positions of the joints of the leg.

11. The control system of claim 10, wherein the measurements of sensors indicative of the mutual positions of joints of the leg include one or a combination of joint angle measurements, joint velocity measurements, and joint torques.

12. The control system of claim 7, wherein an output of the pre-determined imbalance function includes a binary output indicating the detection of the imbalance.

13. The control system of claim 12, wherein the processor is further configured to:

detect the imbalance based on the binary output of the imbalance function; and execute the swing action in response to the detection of the imbalance.

14. The control system of claim 13, wherein the processor is further configured to execute the swing action to correct the detected imbalance by moving the foot of the leg in a center of the shape.

15. The control system of claim 14, wherein the processor is further configured to execute the swing action to correct the detected imbalance by moving the foot of the leg in an anticipated center of the shape based on a velocity of the robot.

16. A control method for controlling a robot to perform a task, wherein the robot is a legged robot comprising a trunk and a plurality of legs for supporting the trunk above a ground, the control method comprising:

collecting a reference trajectory defining a sequence of states of the robot in a time and a space to perform the task;

executing a stance controller configured to compute and apply reaction forces of the plurality of legs of the robot in a contact with the ground to push the trunk of the robot based on the reference trajectory; and executing a swing controller of a plurality of swing controllers to swing a leg in response to detecting a relative position between the trunk and a foot of the leg of the robot indicative of an imbalance of a support of the trunk of the robot above the ground, wherein the imbalance is detected based on a foot position of the leg that is outside of a shape centered on a projection of a hip position to the ground, wherein one or more dimensions of the shape are a function of a speed defined by the reference trajectory, and wherein measurements of mutual positions of joints of the leg of the plurality of legs correspond to the speed defined by the reference trajectory.

* * * * *